United States Patent
Shih et al.

(10) Patent No.: US 11,291,012 B2
(45) Date of Patent: Mar. 29, 2022

(54) METHOD AND APPARATUS FOR SELECTING BEAM FOR PRECONFIGURED UPLINK RESOURCES IN A WIRELESS COMMUNICATION SYSTEM

(71) Applicant: ASUSTek Computer Inc., Taipei (TW)

(72) Inventors: Tun-Huai Shih, Taipei (TW); Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 27 days.

(21) Appl. No.: 16/924,915

(22) Filed: Jul. 9, 2020

(65) Prior Publication Data

US 2021/0037530 A1 Feb. 4, 2021

Related U.S. Application Data

(60) Provisional application No. 62/880,363, filed on Jul. 30, 2019, provisional application No. 62/880,398, filed on Jul. 30, 2019.

(51) Int. Cl.
*H04W 72/04* (2009.01)
*H04W 56/00* (2009.01)
*H04W 76/27* (2018.01)
*H04W 74/08* (2009.01)

(52) U.S. Cl.
CPC ... *H04W 72/0493* (2013.01); *H04W 56/0045* (2013.01); *H04W 72/046* (2013.01); *H04W 72/0413* (2013.01); *H04W 74/0833* (2013.01); *H04W 76/27* (2018.02)

(58) Field of Classification Search
CPC ......... H04W 72/0493; H04W 72/0413; H04W 56/0045; H04W 76/27; H04W 74/0833; H04W 72/046; H04W 72/042; H04W 72/02; H04W 56/0005; H04W 16/28;
(Continued)

(56) References Cited

U.S. PATENT DOCUMENTS

2019/0319686 A1* 10/2019 Chen, IV .............. H04W 48/20
2020/0260397 A1* 8/2020 Vos .......................... H04L 5/003

FOREIGN PATENT DOCUMENTS

| CN | 110536471 | 12/2019 | |
| WO | 2020034571 | 2/2020 | |
| WO | WO-2020026154 A1 * | 2/2020 | ........ H04W 56/0045 |

* cited by examiner

*Primary Examiner* — Thai Nguyen
(74) *Attorney, Agent, or Firm* — Skaar Ulbrich Macari, P.A.

(57) ABSTRACT

Methods and apparatuses for selecting beam for preconfigured uplink resources in a wireless communication system are disclosed herein. In one method, a user equipment (UE) receives, from a network node, a signaling to configure at least one Preconfigured Uplink Resource (PUR) associated with one or more beams from multiple beams. The UE selects a first beam from the multiple beams and performs a transmission of data in RRC_INACTIVE state using the at least one PUR via the first beam if the first beam fulfills at least one condition, wherein the at least one condition comprises that the first beam is associated with the at least one PUR and Reference Symbol Received Power (RSRP) of the first beam is better than a first threshold. The UE initiates a Random Access (RA) procedure and performs the transmission during the RA procedure if no beam of the multiple beams fulfills the at least one condition.

20 Claims, 7 Drawing Sheets

(58) Field of Classification Search
CPC .......................... H04W 72/08; H04W 72/1231; H04B 7/0404; H04B 7/0695; H04B 7/0408
See application file for complete search history.

METHOD AND APPARATUS FOR SELECTING BEAM FOR PRECONFIGURED UPLINK RESOURCES IN A WIRELESS COMMUNICATION SYSTEM

CROSS-REFERENCE TO RELATED APPLICATIONS

The present application claims the benefit of U.S. Provisional Patent Application Ser. Nos. 62/880,363 and 62/880,398 both filed on Jul. 30, 2019, the entire disclosures of which are incorporated herein in their entirety by reference.

FIELD

This disclosure generally relates to wireless communication networks, and more particularly, to a method and apparatus for selecting beam for preconfigured uplink resources in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for selecting beam for preconfigured uplink resources in a wireless communication system are disclosed herein. In one method, a user equipment (UE) receives, from a network node, a signaling to configure at least one Preconfigured Uplink Resource (PUR) associated with one or more beams from multiple beams. The UE selects a first beam from the multiple beams and performs a transmission of data in RRC_INACTIVE state using the at least one PUR via the first beam if the first beam fulfills at least one condition, wherein the at least one condition comprises that the first beam is associated with the at least one PUR and Reference Symbol Received Power (RSRP) of the first beam is better than a first threshold. The UE initiates a Random Access (RA) procedure and performs the transmission during the RA procedure if no beam of the multiple beams fulfills the at least one condition.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: TS 36.300 V15.6.0, "E-UTRA and E-UTRAN, Overall description, Stage 2"; TS 36.321 V15.6.0, "E-UTRA, MAC protocol specification"; TS 36.331 V15.6.0, "E-UTRA, RRC protocol specification"; TS 38.300 V15.6.0, "NR, NR and NG-RAN overall description, Stage 2"; TS 38.321 V15.6.0, "NR, MAC protocol specification"; TS 38.331 V15.6.0, "NR, RRC protocol specification"; TSG RANI #96 Chairman's Notes; TSG RANI #96bis Chairman's Notes; TSG RANI #97 Chairman's Notes; and TSG RAN2 #106 Chairman's Notes. The standards and documents listed above are hereby expressly incorporated by reference in their entirety.

Figure 1:
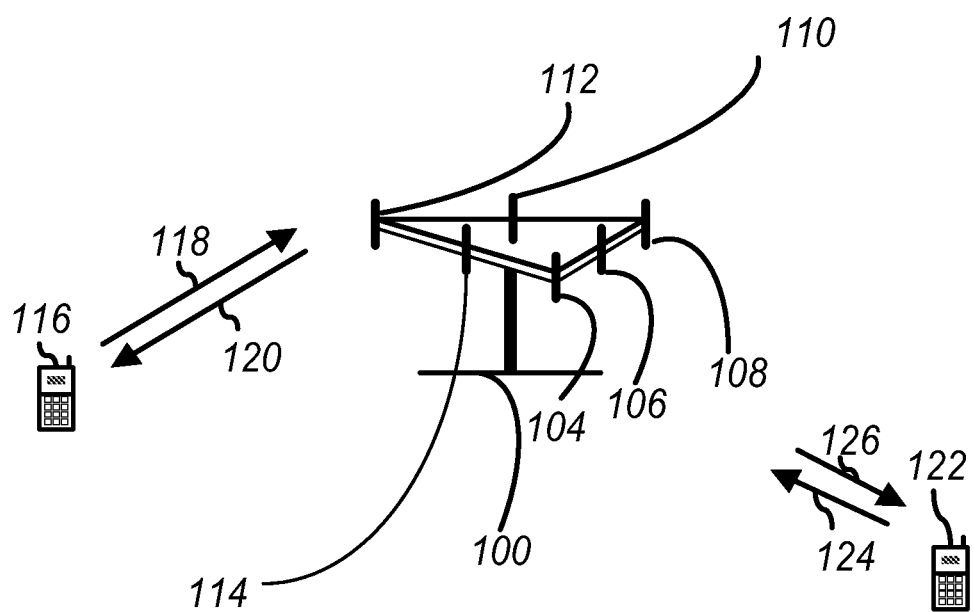
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
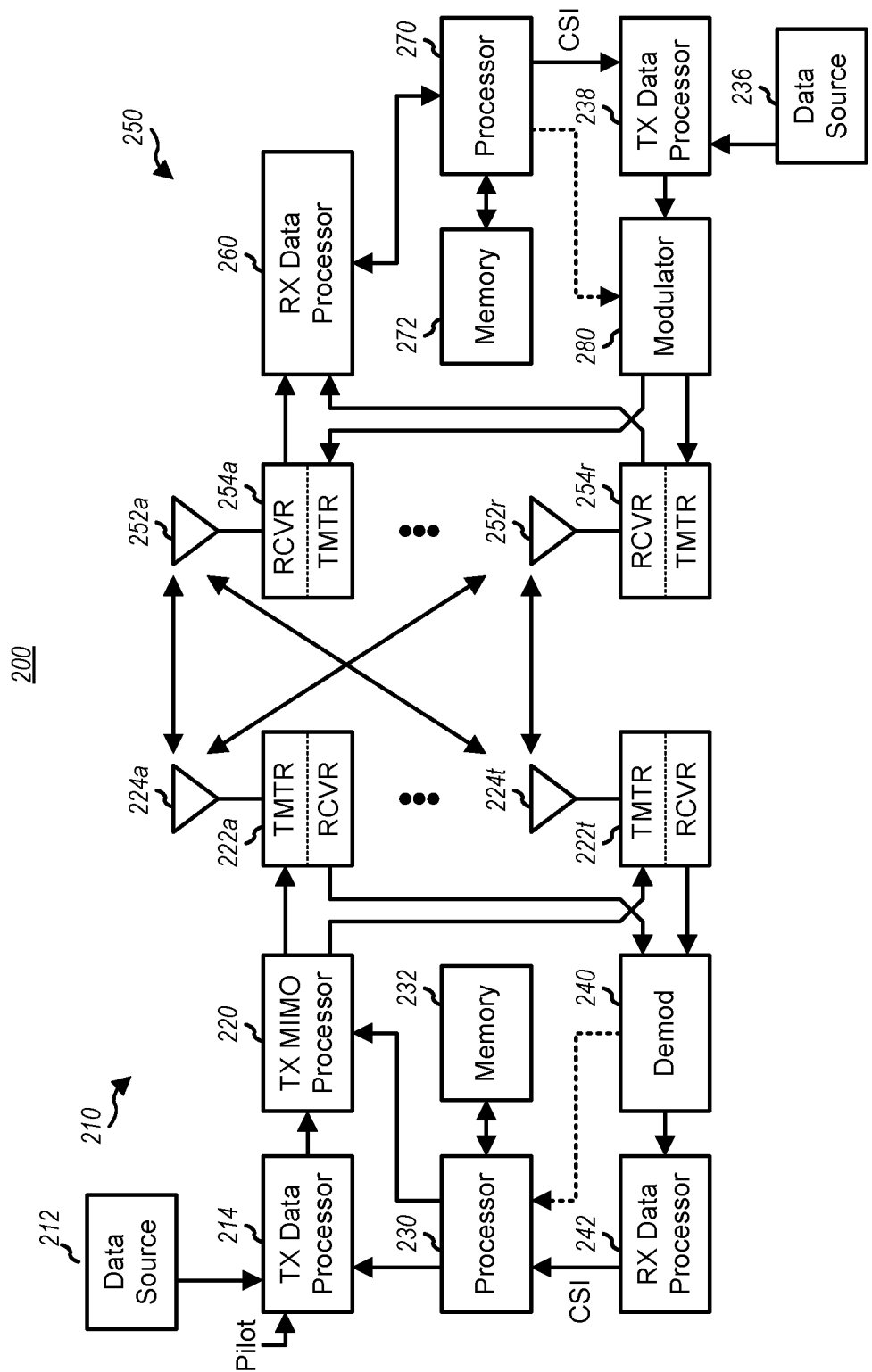
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
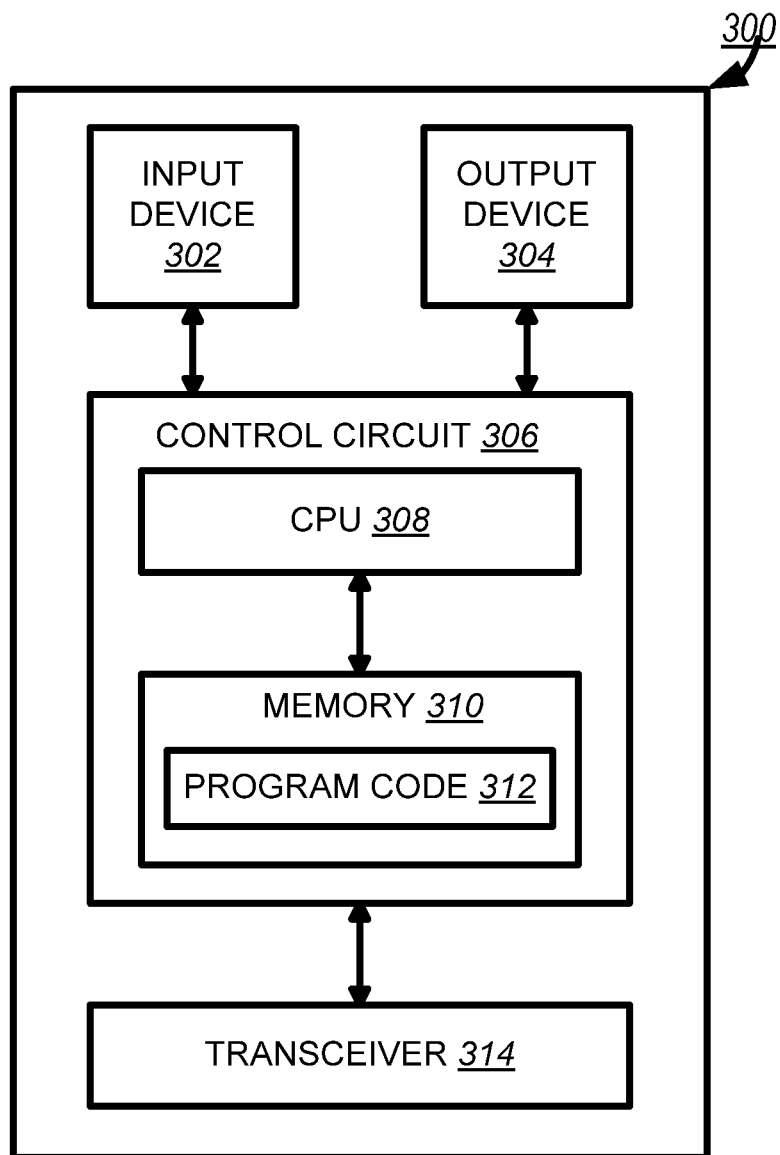
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
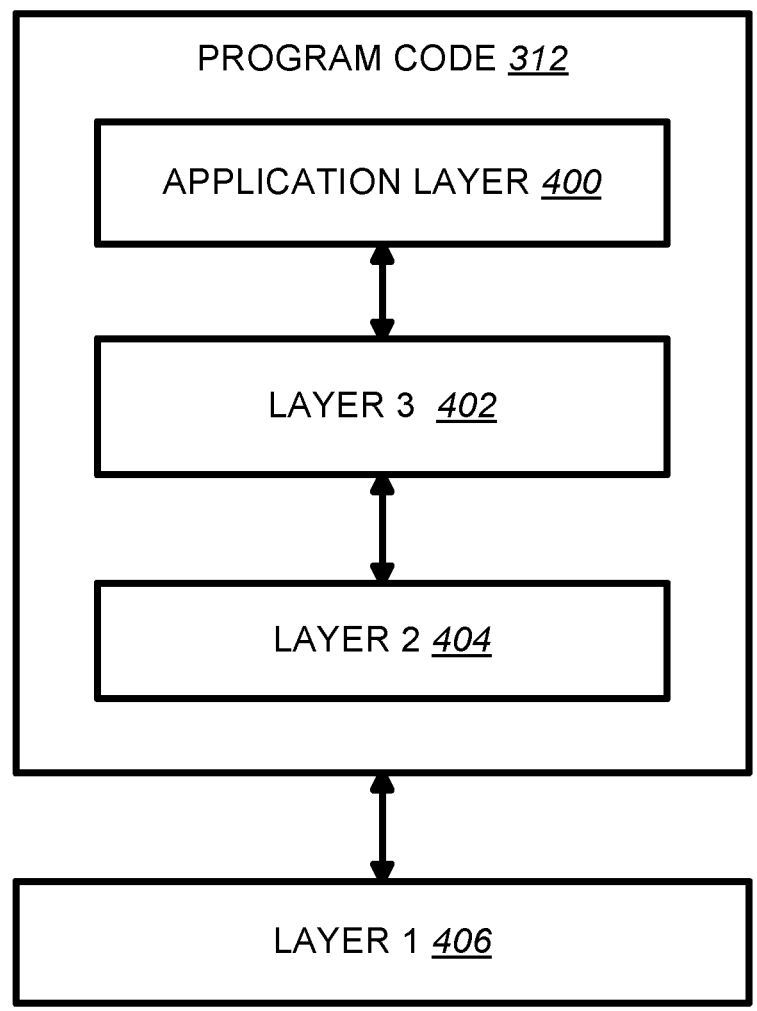
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.300 V15.6.0, "E-UTRA and E-UTRAN, Overall description, Stage 2", discloses enhanced coverage in LTE as quoted below:

23.7b Support of UEs in Enhanced Coverage

A UE in enhanced coverage is a UE that requires the use of enhanced coverage functionality to access the cell. In this release of the specification two enhanced coverage modes (mode A, mode B) are supported. The support of enhanced coverage mode A is mandatory for a BL UE. The maximum PDSCH/PUSCH bandwidth in connected mode for unicast transmission depends on the UE category and enhanced coverage mode as summarized in table 23.7a-1.

A UE may access a cell using enhanced coverage functionality only if the MIB of the cell indicates that scheduling information for SIB1 specific for BL UEs is scheduled. System information procedures for UEs in enhanced coverage are identical to the system information procedures for bandwidth reduced low complexity UEs. A UE capable of enhanced coverage acquires, if needed, and uses legacy system information when in normal coverage if it is not a BL UE. A UE capable of enhanced coverage acquires, if needed, and uses system information specific for UEs in enhanced coverage. A UE in enhanced coverage is not required to detect SIB change when in RRC_CONNECTED.

A set of PRACH resources (e.g. time, frequency, preamble); each associated with a coverage enhancement level, is provided in SIB. Number of PRACH repetitions and number of maximum preamble transmission attempts per coverage enhancement level are provided in SIB. UEs in same enhanced coverage level use random access resources associated with the same enhanced coverage level. Time/frequency resources and repetition factor for random access response messages for UEs in enhanced coverage are derived from the used PRACH resources.

A UE in enhanced coverage is paged using the same mechanism for paging BL UEs. The starting subframe of a paging occasion and the repetition pattern (in both time and frequency domain for downlink common control signaling) of that paging occasion are determined irrespective of the UEs enhanced coverage level.

The paging request from the MME for a UE supporting enhanced coverage functionality may contain enhanced coverage level related information and corresponding cell ID. If neither the UE Radio Capability for Paging IE nor the Assistance Data for Paging IE is included in the paging request from the MME, the eNB may need to page the UE in both PDCCH and MPDCCH.

A UE in RRC_IDLE does not inform the network when it changes the enhanced coverage level.

A UE in enhanced coverage camps on a suitable cell where S criterion for UEs in enhanced coverage is fulfilled. The UE shall re-select to inter-frequency cells in which it is able to operate in normal coverage over cells in which it has to be in enhanced coverage.

Connected mode mobility mechanisms such as measurement reporting, network controlled handover etc., are supported for UEs in enhanced coverage. At handover from a source cell in normal or enhanced coverage mode to a target cell in enhanced coverage mode, the network may provide SIB1-BR to the UE in the handover command. No additional mechanisms are introduced to support the use of enhanced coverage functionality to access an E-UTRA cell during inter-RAT handovers.

Reconfiguration of a UE in connected mode from normal to enhanced coverage mode (and vice versa) is supported by a means of intra-cell handover or RRC configuration without handover.

3GPP TS 38.321 V15.6.0, "NR, MAC protocol specification" discusses Random Access procedures in NR as quoted below:

5.1 Random Access Procedure

5.1.1 Random Access Procedure Initialization

The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.

NOTE 1: If a new Random Access procedure is triggered while another is already ongoing in the MAC entity, it is up to UE implementation whether to continue with the ongoing procedure or start with the new procedure (e.g. for SI request).

RRC configures the following parameters for the Random Access procedure:

prach-ConfigurationIndex: the available set of PRACH occasions for the transmission of the Random Access Preamble;

preambleReceivedTargetPower: initial Random Access Preamble power;

rsrp-ThresholdSSB: an RSRP threshold for the selection of the SSB. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;

rsrp-ThresholdCSI-RS: an RSRP threshold for the selection of CSI-RS. If the Random Access procedure is initiated for beam failure recovery, rsrp-ThresholdCSI-RS is equal to rsrp-ThresholdSSB in BeamFailureRecoveryConfig IE;

rsrp-ThresholdSSB-SUL: an RSRP threshold for the selection between the NUL carrier and the SUL carrier;

candidateBeamRSList: a list of reference signals (CSI-RS and/or SSB) identifying the candidate beams for recovery and the associated Random Access parameters;

recoverySearchSpaceId: the search space identity for monitoring the response of the beam failure recovery request;

powerRampingStep: the power-ramping factor;

powerRampingStepHighPriority: the power-ramping factor in case of prioritized Random Access procedure;

scalingFactorBI: a scaling factor for prioritized Random Access procedure;

ra-PreambleIndex: Random Access Preamble;

ra-ssb-OccasionMaskIndex: defines PRACH occasion(s) associated with an SSB in which the MAC entity may transmit a Random Access Preamble (see clause 7.4);

ra-OccasionList: defines PRACH occasion(s) associated with a CSI-RS in which the MAC entity may transmit a Random Access Preamble;

ra-PreambleStartIndex: the starting index of Random Access Preamble(s) for on-demand SI request;

preambleTransMax: the maximum number of Random Access Preamble transmission;

ssb-perRACH-OccasionAndCB-PreamblesPerSSB: defines the number of SSBs mapped to each PRACH occasion and the number of contention-based Random Access Preambles mapped to each SSB;

if groupBconfigured is configured, then Random Access Preambles group B is configured.

Amongst the contention-based Random Access Preambles associated with an SSB (as defined in TS 38.213 [6]), the first numberOfRA-PreamblesGroupA Random Access Preambles belong to Random Access Preambles group A. The remaining Random Access Preambles associated with the SSB belong to Random Access Preambles group B (if configured).

NOTE 2: If Random Access Preambles group B is supported by the cell Random Access Preambles group B is included for each SSB.

if Random Access Preambles group B is configured:
  ra-Msg3SizeGroupA: the threshold to determine the groups of Random Access Preambles;
  msg3-DeltaPreamble: $\Delta_{PREAMBLE\_Msg3}$ in TS 38.213 [6];
  messagePowerOffsetGroupB: the power offset for preamble selection;
  numberOfRA-PreamblesGroupA: defines the number of Random Access Preambles in Random Access Preamble group A for each SSB.
the set of Random Access Preambles and/or PRACH occasions for SI request, if any;
the set of Random Access Preambles and/or PRACH occasions for beam failure recovery request, if any;
the set of Random Access Preambles and/or PRACH occasions for reconfiguration with sync, if any;
ra-ResponseWindow: the time window to monitor RA response(s) (SpCell only);
ra-ContentionResolutionTimer: the Contention Resolution Timer (SpCell only).

In addition, the following information for related Serving Cell is assumed to be available for UEs:
  if Random Access Preambles group B is configured:
    if the Serving Cell for the Random Access procedure is configured with supplementary uplink as specified in TS 38.331 [5], and SUL carrier is selected for performing Random Access Procedure:
      $P_{CMAX,f,c}$ of the SUL carrier as specified in TS 38.101-1 [14], TS 38.101-2 [15], and TS 38.101-3 [16].
    else:
      $P_{CMAX,f,c}$ of the NUL carrier as specified in TS 38.101-1 [14], TS 38.101-2 [15], and TS 38.101-3 [16].

The following UE variables are used for the Random Access procedure:
  PREAMBLE_INDEX;
  PREAMBLE_TRANSMISSION_COUNTER;
  PREAMBLE_POWER_RAMPING_COUNTER;
  PREAMBLE_POWER_RAMPING_STEP;
  PREAMBLE_RECEIVED_TARGET_POWER;
  PREAMBLE_BACKOFF;
  PCMAX;
  SCALING_FACTOR_BI;
  TEMPORARY_C-RNTI.

When the Random Access procedure is initiated on a Serving Cell, the MAC entity shall:
1> flush the Msg3 buffer;
1> set the PREAMBLE_TRANSMISSION_COUNTER to 1;
1> set the PREAMBLE_POWER_RAMPING_COUNTER to 1;
1> set the PREAMBLE_BACKOFF to 0 ms;
1> if the carrier to use for the Random Access procedure is explicitly signalled:
  2> select the signalled carrier for performing Random Access procedure;
  2> set the PCMAX to $P_{CMAX,f,c}$ of the signalled carrier.
1> else if the carrier to use for the Random Access procedure is not explicitly signalled; and
1> if the Serving Cell for the Random Access procedure is configured with supplementary uplink as specified in TS 38.331 [5]; and
1> if the RSRP of the downlink pathloss reference is less than rsrp-ThresholdSSB-SUL:
  2> select the SUL carrier for performing Random Access procedure;
  2> set the PCMAX to $P_{CMAX,f,c}$ of the SUL carrier.
1> else:
  2> select the NUL carrier for performing Random Access procedure;
  2> set the PCMAX to $P_{CMAX,f,c}$ of the NUL carrier.
1> perform the BWP operation as specified in clause 5.15;
1> set PREAMBLE_POWER_RAMPING_STEP to powerRampingStep;
1> set SCALING_FACTOR_BI to 1;
1> if the Random Access procedure was initiated for beam failure recovery (as specified in clause 5.17); and
1> if beamFailureRecoveryConfig is configured for the active UL BWP of the selected carrier:
  2> start the beamFailureRecoveryTimer, if configured;
  2> apply the parameters powerRampingStep, preambleReceivedTargetPower, and preambleTransMax configured in the beamFailureRecoveryConfig;
  2> if powerRampingStepHighPriority is configured in the beamFailureRecoveryConfig:
    3> set PREAMBLE_POWER_RAMPING_STEP to the powerRampingStepHighPriority.
  2> else:
    3> set PREAMBLE_POWER_RAMPING_STEP to powerRampingStep.
  2> if scalingFactorBI is configured in the beamFailureRecoveryConfig:
    3> set SCALING_FACTOR_BI to the scalingFactorBI.
1> else if the Random Access procedure was initiated for handover; and
1> if rach-ConfigDedicated is configured for the selected carrier:
  2> if powerRampingStepHighPriority is configured in the rach-ConfigDedicated:
    3> set PREAMBLE_POWER_RAMPING_STEP to the powerRampingStepHighPriority.
  2> if scalingFactorBI is configured in the rach-ConfigDedicated:
    3> set SCALING_FACTOR_BI to the scalingFactorBI.
1> perform the Random Access Resource selection procedure (see clause 5.1.2).

5.1.2 Random Access Resource Selection

The MAC entity shall:
1> if the Random Access procedure was initiated for beam failure recovery (as specified in clause 5.17); and
1> if the beamFailureRecoveryTimer (in clause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
  2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;

2> if CSI-RS is selected, and there is no ra-PreambleIndex associated with the selected CSI-RS:
   3> set the PREAMBLE_INDEX to a ra-PreambleIndex corresponding to the SSB in candidateBeamRSList which is quasi-colocated with the selected CSI-RS as specified in TS 38.214 [7].
2> else:
   3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
   2> set the PREAMBLE_INDEX to the signalled ra-PreambleIndex;
   2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
   2> select an SSB with SS-RSRP above rsrp-ThresholdSSB amongst the associated SSBs;
   2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
   2> select a CSI-RS with CSI-RSRP above rsrp-ThresholdCSI-RS amongst the associated CSI-RSs;
   2> set the PREAMBLE_INDEX to a ra-PreambleIndex corresponding to the selected CSI-RS.
1> else if the Random Access procedure was initiated for SI request (as specified in TS 38.331 [5]); and
1> if the Random Access Resources for SI request have been explicitly provided by RRC:
   2> if at least one of the SSBs with SS-RSRP above rsrp-ThresholdSSB is available:
      3> select an SSB with SS-RSRP above rsrp-ThresholdSSB.
   2> else:
      3> select any SSB.
   2> select a Random Access Preamble corresponding to the selected SSB, from the Random Access Preamble(s) determined according to ra-PreambleStartIndex as specified in TS 38.331 [5];
   2> set the PREAMBLE_INDEX to selected Random Access Preamble.
1> else (i.e. for the contention-based Random Access preamble selection):
   2> if at least one of the SSBs with SS-RSRP above rsrp-ThresholdSSB is available:
      3> select an SSB with SS-RSRP above rsrp-ThresholdSSB.
   2> else:
      3> select any SSB.
   2> if Msg3 has not yet been transmitted:
      3> if Random Access Preambles group B is configured:
         4> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower—msg3-DehaPreamble—messagePowerOffsetGroupB; or
         4> if the Random Access procedure was initiated for the CCCH logical channel and the CCCH SDU size plus MAC subheader is greater than ra-Msg3SizeGroupA:
            5> select the Random Access Preambles group B.
         4> else:
            5> select the Random Access Preambles group A.
      3> else:
         4> select the Random Access Preambles group A.
   2> else (i.e. Msg3 is being retransmitted):
      3> select the same group of Random Access Preambles as was used for the Random Access Preamble transmission attempt corresponding to the first transmission of Msg3.
   2> select a Random Access Preamble randomly with equal probability from the Random Access Preambles associated with the selected SSB and the selected Random Access Preambles group.
   2> set the PREAMBLE_INDEX to the selected Random Access Preamble.
1> if the Random Access procedure was initiated for SI request (as specified in TS 38.331 [5]); and
1> if ra-AssociationPeriodIndex and si-RequestPeriod are configured:
   2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to clause 8.1 of TS 38.213 [6] corresponding to the selected SSB).
1> else if an SSB is selected above:
   2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).
1> else if a CSI-RS is selected above:
   2> if there is no contention-free Random Access Resource associated with the selected CSI-RS:
      3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).

2> else:
- 3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

1> perform the Random Access Preamble transmission procedure (see clause 5.1.3).

NOTE: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.

5.1.4 Random Access Response Reception

Once the Random Access Preamble is transmitted and regardless of the possible occurrence of a measurement gap, the MAC entity shall:

1> if the contention-free Random Access Preamble for beam failure recovery request was transmitted by the MAC entity:
- 2> start the ra-Response Window configured in BeamFailureRecoveryConfig at the first PDCCH occasion as specified in TS 38.213 [6] from the end of the Random Access Preamble transmission;
- 2> monitor for a PDCCH transmission on the search space indicated by recoverySearchSpaceId of the SpCell identified by the C-RNTI while ra-Response Window is running.

1> else:
- 2> start the ra-Response Window configured in RACH-ConfigCommon at the first PDCCH occasion as specified in TS 38.213 [6] from the end of the Random Access Preamble transmission;
- 2> monitor the PDCCH of the SpCell for Random Access Response(s) identified by the RA-RNTI while the ra-Response Window is running.

1> if notification of a reception of a PDCCH transmission on the search space indicated by recoverySearchSpaceId is received from lower layers on the Serving Cell where the preamble was transmitted; and 1> if PDCCH transmission is addressed to the C-RNTI; and 1> if the contention-free Random Access Preamble for beam failure recovery request was transmitted by the MAC entity:
- 2> consider the Random Access procedure successfully completed.

1> else if a downlink assignment has been received on the PDCCH for the RA-RNTI and the received TB is successfully decoded:
- 2> if the Random Access Response contains a MAC subPDU with Backoff Indicator:
  - 3> set the PREAMBLE_BACKOFF to value of the BI field of the MAC subPDU using Table 7.2-1, multiplied with SCALING_FACTOR_BI.
- 2> else:
  - 3> set the PREAMBLE_BACKOFF to 0 ms.
- 2> if the Random Access Response contains a MAC subPDU with Random Access Preamble identifier corresponding to the transmitted PREAMBLE_INDEX (see clause 5.1.3):
  - 3> consider this Random Access Response reception successful.
- 2> if the Random Access Response reception is considered successful:
  - 3> if the Random Access Response includes a MAC subPDU with RAPID only:
    - 4> consider this Random Access procedure successfully completed;
    - 4> indicate the reception of an acknowledgement for SI request to upper layers.
  - 3> else:
    - 4> apply the following actions for the Serving Cell where the Random Access Preamble was transmitted:
      - 5> process the received Timing Advance Command (see clause 5.2);
      - 5> indicate the preambleReceivedTargetPower and the amount of power ramping applied to the latest Random Access Preamble transmission to lower layers (i.e. (PREAMBLE_POWER_RAMPING_COUNTER–1)×PREAMBLE_POWER_RAMPING_STEP);
      - 5> if the Serving Cell for the Random Access procedure is SRS-only SCell:
        - 6> ignore the received UL grant.
      - 5> else:
        - 6> process the received UL grant value and indicate it to the lower layers.
    - 4> if the Random Access Preamble was not selected by the MAC entity among the contention-based Random Access Preamble(s):
      - 5> consider the Random Access procedure successfully completed.
    - 4> else:
      - 5> set the TEMPORARY_C-RNTI to the value received in the Random Access Response;
      - 5> if this is the first successfully received Random Access Response within this Random Access procedure:
        - 6> if the transmission is not being made for the CCCH logical channel:
          - 7> indicate to the Multiplexing and assembly entity to include a C-RNTI MAC CE in the subsequent uplink transmission.
        - 6> obtain the MAC PDU to transmit from the Multiplexing and assembly entity and store it in the Msg3 buffer.

NOTE: If within a Random Access procedure, an uplink grant provided in the Random Access Response for the same group of contention-based Random Access Preambles has a different size than the first uplink grant allocated during that Random Access procedure, the UE behavior is not defined.

1> if ra-Response Window configured in BeamFailureRecoveryConfig expires and if a PDCCH transmission on the search space indicated by recoverySearchSpaceId addressed to the C-RNTI has not been received on the Serving Cell where the preamble was transmitted; or 1> if ra-Response Window configured in RACH-ConfigCommon expires, and if the Random Access Response containing Random Access Preamble identifiers that matches the transmitted PREAMBLE_INDEX has not been received:

2> consider the Random Access Response reception not successful;
2> increment PREAMBLE_TRANSMISSION_COUNTER by 1;
2> if PREAMBLE_TRANSMISSION_COUNTER= preambleTransMax+1:
  3> if the Random Access Preamble is transmitted on the SpCell:
    4> indicate a Random Access problem to upper layers;
    4> if this Random Access procedure was triggered for SI request:
      5> consider the Random Access procedure unsuccessfully completed.
  3> else if the Random Access Preamble is transmitted on a SCell:
    4> consider the Random Access procedure unsuccessfully completed.
2> if the Random Access procedure is not completed:
  3> select a random backoff time according to a uniform distribution between 0 and the PREAMBLE_BACKOFF;
  3> if the criteria (as defined in clause 5.1.2) to select contention-free Random Access Resources is met during the backoff time:
    4> perform the Random Access Resource selection procedure (see clause 5.1.2);
  3> else:
    4> perform the Random Access Resource selection procedure (see clause 5.1.2) after the backoff time.

The MAC entity may stop ra-Response Window (and hence monitoring for Random Access Response(s)) after successful reception of a Random Access Response containing Random Access Preamble identifiers that matches the transmitted PREAMBLE_INDEX.

HARQ operation is not applicable to the Random Access Response reception.

3GPP TS 38.300 V15.6.0, "NR, NR and NG-RAN overall description, Stage 2", discusses beam operation in NR as quoted below:

9.2.3 Mobility in RRC_CONNECTED
9.2.3.1 Overview

Network controlled mobility applies to UEs in RRC_CONNECTED and is categorized into two types of mobility: cell level mobility and beam level mobility.

Figure 5:
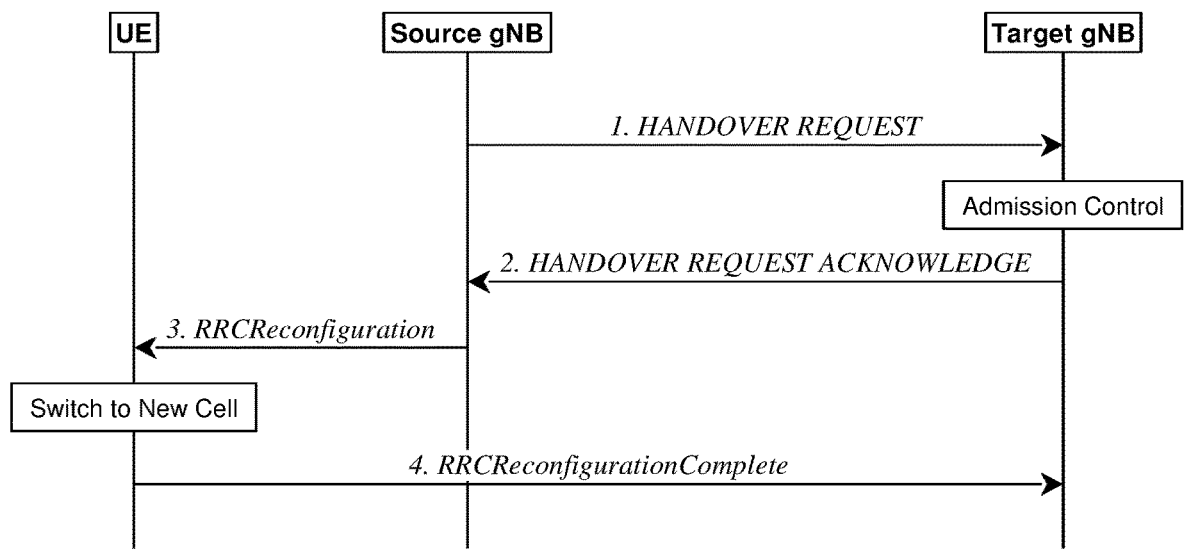
FIG. 5 is a reproduction of FIG. 9.2.3.1-1 showing Inter-gNB handover procedures taken from 3GPP TS 38.300 V15.6.0.

Cell Level Mobility requires explicit RRC signalling to be triggered, i.e. handover. For inter-gNB handover, the signalling procedures consist of at least the following elemental components illustrated in FIG. 9.2.3.1-1:

FIG. 9.2.3.1-1 reproduced as FIG. 5.
1. The source gNB initiates handover and issues a HANDOVER REQUEST over the Xn interface.
2. The target gNB performs admission control and provides the new RRC configuration as part of the HANDOVER REQUEST ACKNOWLEDGE.
3. The source gNB provides the RRC configuration to the UE by forwarding the RRCReconfiguration message received in the HANDOVER REQUEST ACKNOWLEDGE. The RRCReconfiguration message includes at least cell ID and all information required to access the target cell so that the UE can access the target cell without reading system information. For some cases, the information required for contention-based and contention-free random access can be included in the RRCReconfiguration message. The access information to the target cell may include beam specific information, if any.
4. The UE moves the RRC connection to the target gNB and replies with the RRCReconfigurationComplete.
NOTE: User Data can also be sent in step 4 if the grant allows.

The handover mechanism triggered by RRC requires the UE at least to reset the MAC entity and re-establish RLC. RRC managed handovers with and without PDCP entity re-establishment are both supported. For DRBs using RLC AM mode, PDCP can either be re-established together with a security key change or initiate a data recovery procedure without a key change. For DRBs using RLC UM mode and for SRBs, PDCP can either be re-established together with a security key change or remain as it is without a key change.

Data forwarding, in-sequence delivery and duplication avoidance at handover can be guaranteed when the target gNB uses the same DRB configuration as the source gNB.

Timer based handover failure procedure is supported in NR. RRC connection re-establishment procedure is used for recovering from handover failure.

Beam Level Mobility does not require explicit RRC signalling to be triggered. The gNB provides via RRC signalling the UE with measurement configuration containing configurations of SSB/CSI resources and resource sets, reports and trigger states for triggering channel and interference measurements and reports. Beam Level Mobility is then dealt with at lower layers by means of physical layer and MAC layer control signalling, and RRC is not required to know which beam is being used at a given point in time.

SSB-based Beam Level Mobility is based on the SSB associated to the initial DL BWP and can only be configured for the initial DL BWPs and for DL BWPs containing the SSB associated to the initial DL BWP. For other DL BWPs, Beam Level Mobility can only be performed based on CSI-RS.

9.2.4 Measurements

In RRC_CONNECTED, the UE measures multiple beams (at least one) of a cell and the measurements results (power values) are averaged to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNB.

Figure 6:
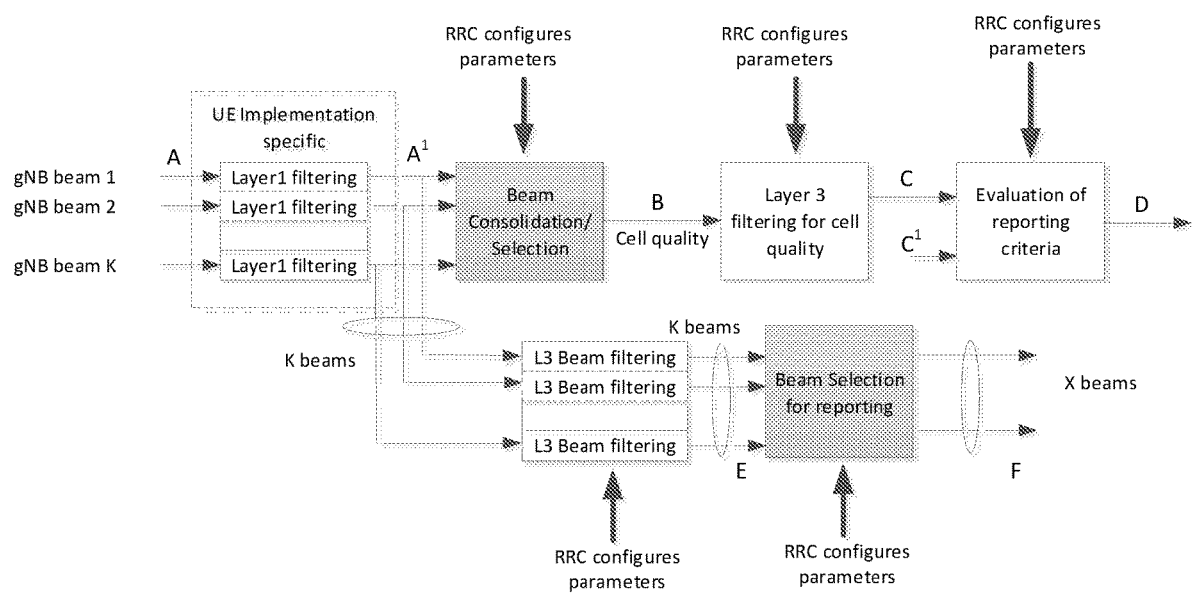
FIG. 6 is a reproduction of FIG. 9.2.4-1 showing Measurement Model taken from 3GPP TS 38.300 V15.6.0.

The corresponding high-level measurement model is described below:

FIG. 9.2.4-1 reproduced as FIG. 6.

NOTE: K beams correspond to the measurements on SSB or CSI-RS resources configured for L3 mobility by gNB and detected by UE at L1.

A: measurements (beam specific samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) in not constrained by the standard.

$A^1$: measurements (i.e. beam specific measurements) reported by layer 1 to layer 3 after layer 1 filtering.

Beam Consolidation/Selection: beam specific measurements are consolidated to derive cell quality. The behaviour of the Beam consolidation/selection is standardised and the configuration of this module is provided by RRC signalling. Reporting period at B equals one measurement period at $A^1$.

B: a measurement (i.e. cell quality) derived from beam-specific measurements reported to layer 3 after beam consolidation/selection.

Layer 3 filtering for cell quality: filtering performed on the measurements provided at point B. The behaviour of the Layer 3 filters is standardised and the configuration of the layer 3 filters is provided by RRC signalling. Filtering reporting period at C equals one measurement period at B.

C: a measurement after processing in the layer 3 filter. The reporting rate is identical to the reporting rate at point B. This measurement is used as input for one or more evaluation of reporting criteria.

Evaluation of reporting criteria: checks whether actual measurement reporting is necessary at point D. The evaluation can be based on more than one flow of measurements at reference point C e.g. to compare between different measurements. This is illustrated by input C and $C^1$. The UE shall evaluate the reporting criteria at least every time a new measurement result is reported at point C, $C^1$. The reporting criteria are standardised and the configuration is provided by RRC signalling (UE measurements).

D: measurement report information (message) sent on the radio interface.

L3 Beam filtering: filtering performed on the measurements (i.e. beam specific measurements) provided at point $A^1$. The behaviour of the beam filters is standardised and the configuration of the beam filters is provided by RRC signalling. Filtering reporting period at E equals one measurement period at $A^1$.

E: a measurement (i.e. beam-specific measurement) after processing in the beam filter. The reporting rate is identical to the reporting rate at point $A^1$. This measurement is used as input for selecting the X measurements to be reported.

Beam Selection for beam reporting: selects the X measurements from the measurements provided at point E. The behaviour of the beam selection is standardised and the configuration of this module is provided by RRC signalling.

F: beam measurement information included in measurement report (sent) on the radio interface.

Layer 1 filtering introduces a certain level of measurement averaging. How and when the UE exactly performs the required measurements is implementation specific to the point that the output at B fulfils the performance requirements set in TS 38.133 [13]. Layer 3 filtering for cell quality and related parameters used are specified in TS 38.331 [12] and do not introduce any delay in the sample availability between B and C. Measurement at point C, $C^1$ is the input used in the event evaluation. L3 Beam filtering and related parameters used are specified in TS 38.331 [12] and do not introduce any delay in the sample availability between E and F.

Measurement reports are characterized by the following:
Measurement reports include the measurement identity of the associated measurement configuration that triggered the reporting;
Cell and beam measurement quantities to be included in measurement reports are configured by the network;
The number of non-serving cells to be reported can be limited through configuration by the network;
Cells belonging to a blacklist configured by the network are not used in event evaluation and reporting, and conversely when a whitelist is configured by the network, only the cells belonging to the whitelist are used in event evaluation and reporting;
Beam measurements to be included in measurement reports are configured by the network (beam identifier only, measurement result and beam identifier, or no beam reporting).

Intra-frequency neighbour (cell) measurements and inter-frequency neighbour (cell) measurements are defined as follows:

SSB based intra-frequency measurement: a measurement is defined as an SSB based intra-frequency measurement provided the center frequency of the SSB of the serving cell and the center frequency of the SSB of the neighbour cell are the same, and the subcarrier spacing of the two SSBs is also the same.

SSB based inter-frequency measurement: a measurement is defined as an SSB based inter-frequency measurement provided the center frequency of the SSB of the serving cell and the center frequency of the SSB of the neighbour cell are different, or the subcarrier spacing of the two SSBs is different.

NOTE: For SSB based measurements, one measurement object corresponds to one SSB and the UE considers different SSBs as different cells.

CSI-RS based intra-frequency measurement: a measurement is defined as a CSI-RS based intra-frequency measurement provided the bandwidth of the CSI-RS resource on the neighbour cell configured for measurement is within the bandwidth of the CSI-RS resource on the serving cell configured for measurement, and the subcarrier spacing of the two CSI-RS resources is the same.

CSI-RS based inter-frequency measurement: a measurement is defined as a CSI-RS based inter-frequency measurement provided the bandwidth of the CSI-RS resource on the neighbour cell configured for measurement is not within the bandwidth of the CSI-RS resource on the serving cell configured for measurement, or the subcarrier spacing of the two CSI-RS resources is different.

Whether a measurement is non-gap-assisted or gap-assisted depends on the capability of the UE, the active BWP of the UE and the current operating frequency:

For SSB based inter-frequency, a measurement gap configuration is always provided in the following cases:
If the UE only supports per-UE measurement gaps;
If the UE supports per-FR measurement gaps and any of the configured BWP frequencies of any of the serving cells are in the same frequency range of the measurement object.

For SSB based intra-frequency measurement, a measurement gap configuration is always provided in the following case:
Other than the initial BWP, if any of the UE configured BWPs do not contain the frequency domain resources of the SSB associated to the initial DL BWP.

In non-gap-assisted scenarios, the UE shall be able to carry out such measurements without measurement gaps. In gap-assisted scenarios, the UE cannot be assumed to be able to carry out such measurements without measurement gaps.

Text related to RAN1 agreements for Preconfigured Uplink Resources (PUR) in LTE are quoted below from 3GPP TSG RAN1 #96 Chairman's Notes:

Additional MTC Enhancements

Agreement

In idle mode, the TA validation configuration can include "PUR Time Alignment Timer"
- Where the UE considers the TA as invalid if the (current time−time at last TA update)>the PUR Time Alignment Timer
- Details on how to specify the "PUR Time Alignment Timer" is up to RAN2

Agreement

In idle mode, when the UE validates TA, the UE considers the TA for the previous serving cell as invalid if the serving cell changes
- Above applies for the case where the UE is configured to use the serving cell change attribute Agreement For dedicated PUR in idle mode, the Dedicated PUR ACK is at least sent on MPDCCH
- RAN2 can decide if a higher layer PUR ACK is also supported Agreement For dedicated PUR in idle mode, the PUR search space configuration shall be included in the PUR configuration.
- PUR search space is the search space where UE monitors for MPDCCH
- FFS: Whether PUR search space is common or UE specific Agreement When the TA is validated and found to be invalid and the UE has data to send, the UE can obtain a valid TA and may send data via legacy RACH or EDT procedures
- FFS whether only TA is acquired and then data sent on PUR is supported
- FFS other approaches to obtain a valid TA Agreement When the UE is configured to use several TA validation criteria, the TA is valid only when all the configured TA validation criteria are satisfied.

Agreement

For dedicated PUR, in idle mode, the PUR resource configuration includes at least the following
- Time domain resources including periodicity(s)
  - Note: also includes number of repetitions, number of RUs, starting position
- Frequency domain resources
- TBS(s)/MCS(s)
- Power control parameters
- Legacy DMRS pattern Agreement In idle mode, at least the following PUR configurations and PUR parameters may be updated after a PUR transmission:
- Timing advance adjustment
- UE TX power adjustment
- FFS: Repetition adjustment for PUSCH
- FFS: Whether the above update is done in L1 and/or higher layer Agreement In idle mode, the PUR search space configuration includes at least the following:
- MPDCCH narrowband location
- MPDCCH repetitions and aggregation levels
- MPDCCH starting subframe periodicity (variable G)
- Starting subframe position (alpha_offset)

Agreement

For dedicated PUR in idle mode, the PUR resource configuration includes at least the following A PUSCH frequency hopping indication to enable or disable legacy frequency hopping Agreement In idle mode, a UE can be configured such that TA is always valid within a given cell.
- FFS: up to RAN2 how to implement e.g. PUR Time Alignment Timer=infinity Additional Enhancements for NB-IoT Agreement When the UE is configured to use several TA validation criteria, the TA is valid only when all the configured TA validation criteria are satisfied.

Agreement

For dedicated PUR in idle mode, the PUR search space configuration shall be included in the PUR configuration.
- PUR search space is the search space where UE monitors for NPDCCH
- FFS: Whether PUR search space is common or UE specific Agreement In idle mode, the TA validation configuration can include "PUR Time Alignment Timer"
- Where the UE considers the TA as invalid if the (current time−time at last TA update)>the PUR Time Alignment Timer
- Details on how to specify the "PUR Time Alignment Timer" is up to RAN2

Agreement

In idle mode, when the UE validates TA, the UE considers the TA for the previous serving cell as invalid if the serving cell changes
- Above applies for the case where the UE is configured to use the serving cell change attribute Agreement For dedicated PUR in idle mode, the dedicated PUR ACK is at least sent on NPDCCH
- FFS: Whether to introduce new field in DCI or reuse existing field
- RAN2 can decide if a higher layer PUR ACK is also supported Agreement When the TA is validated and found to be invalid and the UE has data to send, the UE can obtain a valid TA and may send data via legacy RACH or EDT procedures
- FFS whether only TA is acquired and then data sent on PUR is supported
- FFS other approaches to obtain a valid TA Agreement In idle mode, at least the following PUR configurations and PUR parameters may be updated after a PUR transmission:
- Timing advance adjustment
- UE TX power adjustment
- FFS: Repetition adjustment for NPUSCH
- FFS: Whether the above update is done in L1 and/or higher layer Agreement In idle mode, the PUR search space configuration includes at least the following:
- NPDCCH repetitions and aggregation levels
- NPDCCH starting subframe periodicity (variable G)
- Starting subframe position (alpha_offset)

Agreement

For dedicated PUR, in idle mode, the PUR resource configuration includes at least the following Time domain resources including periodicity(s)
  Note: also includes number of repetitions, number of RUs, starting position
Frequency domain resources
TBS(s)/MCS(s)
Power control parameters
Legacy DMRS Pattern Text related to RAN1 agreements for Preconfigured Uplink Resources (PUR) in LTE are quoted below from 3GPP TSG RAN1 #96bis Chairman's Notes:
  Additional MTC Enhancements
  Working Assumption #1
  In idle mode, updating PUR configurations and/or PUR parameters via L1 signalling after a PUR transmission is supported
    FFS: Which PUR configurations and PUR parameters will be signaled via L1
    FFS: Definition of PUR configurations and PUR parameters
  The working assumption will be automatically confirmed if for some cases L2/L3 signaling is not needed. If RAN2 decides that L2/L3 signaling is needed for all cases, the working assumption will be reverted.
  Working Assumption #2
  For Dedicated PUR
    During the PUR search space monitoring, the UE monitors for DCI scrambled with a RNTI assuming that the RNTI is not shared with any other UE
      Note: It is up to RAN2 to decide how the RNTI is signaled to UE or derived
    FFS if the UE monitors any additional RNTI which may be shared with other UEs.
    Note: The same RNTI may be used over non-overlapping time and/or frequency resources Send an LS to RAN2 to include two above working assumptions. Ask whether the first bullet in working assumption #2 is feasible. If it is concluded that working assumption #2 is feasible, the working assumption #2 will be automatically confirmed.
  Agreement
  The UE monitors the MPDCCH for at least a time period after a PUR transmission
    FFS: Details of the time period
    FFS: UE behaviour if nothing is received in the time period
    FFS: If and how often UE monitors MPDCCH after a PUR allocation in which it has not transmitted
  Agreement
  The value(s) of RSRP threshold(s) is UE specific
  Agreement
  The power control parameters within the PUR configuration, shall at least include:
    Target UL power level (P_0) for the PUR transmission
  Agreement
  For dedicated PUR in idle mode, the PUR configuration is configured by UE-specific RRC signaling.
  Additional Enhancements for NB-IoT
  Agreement
  In idle mode, a UE can be configured such that TA is always valid within a given cell.
    Up to RAN2 how to implement
      e.g. PUR Time Alignment Timer or NRSRP Threshold=infinity
  Agreement
  The value(s) of NRSRP threshold(s) is UE specific
  Agreement
  The UE monitors the NPDCCH for at least a time period after a PUR transmission.
    FFS: Details of the time period
    FFS: UE behaviour if nothing is received in that time period.
    FFS: If and how often UE monitors NPDCCH after a PUR allocation in which it has not transmitted
  Agreement
  Reuse existing field(s) of DCI format N0 to convey the dedicated PUR ACK
  Agreement
  After data transmission on PUR, upon unsuccessful decoding by eNB, the UE can expect an UL grant for retransmission on NPDCCH. Other behaviors are FFS.
  Working Assumption #1
  In idle mode, updating PUR configurations and/or PUR parameters via L1 signalling after a PUR transmission is supported
    FFS: Which PUR configurations and PUR parameters will be signaled via L1
    FFS: Definition of PUR configurations and PUR parameters
  The working assumption will be automatically confirmed if for some cases L2/L3 signaling is not needed. If RAN2 decides that L2/L3 signaling is needed for all cases, the working assumption will be reverted.
  Working Assumption #2
  For dedicated PUR
    During the PUR search space monitoring, the UE monitors for DCI scrambled with a RNTI assuming that the RNTI is not shared with any other UE
      Note: It is up to RAN2 to decide how the RNTI is signaled to UE or derived
    FFS if the UE monitors any additional RNTI which may be shared with other UEs.
    Note: The same RNTI may be used over non-overlapping time and/or frequency resources
    Send an LS to RAN2 to include two above working assumptions. Ask whether the first bullet in working assumption #2 is feasible. If it is concluded that working assumption #2 is feasible, the working assumption #2 will be automatically confirmed. (LS is approved in eMTC agenda item—see 6.2.1.2)
  Agreement
  For dedicated PUR in idle mode, the PUR configuration is configured by UE-specific RRC signaling.

Text related to RAN1 agreements for Preconfigured Uplink Resources (PUR) in LTE are quoted below from 3GPP TSG RAN1 #97 Chairman's Notes:
  Additional MTC Enhancements
  Agreement
  For a given UE, for dedicated PUR in idle mode and for a given CE mode, the same size DCI, the same PUR M-PDCCH candidates, and the same RNTI is used for all DCI messages for unicast transmissions.
  Agreement
  For dedicated PUR in idle mode and for HD-FDD UEs, the start of the PUR SS Window is [x] subframes after the end PUR transmission
    FFS: Value of x, and if x is fixed or signaled
    FFS: FD-FDD UEs, TDD UEs
    FFS: Support for monitoring of PUR SS Window before PUR transmission
  Note: The PUR SS Window is the time period where the UE monitors the MPDCCH for at least a time period after a PUR transmission Agreement For dedicated PUR in idle mode, The maximum mPDDCH repetitions, $r_{max}$-mPDCCH-PUR, is included in the PUR configuration Agreement For dedicated PUR in idle mode, the duration of the PUR SS window is configured by eNB How the duration is configured, and the possible values, will be decided by RAN2.

Agreement

For dedicated PUR in idle mode, the CE mode is

Option 1: explicitly configured in the PUR configuration.

Option 2: based on CE mode of last connection

Down select in RAN1 #98

Agreement

Select one of the following in RAN1 #98

Alt1: In idle mode, the PUR search space PRB pairs is configured between {2, 2+4, 4} PRBs Alt2: In idle mode, the PUR search space PRB pairs is fixed to 2+4 PRBs Agreement For dedicated PUR in idle mode, if a UE skips a PUR transmission, it is not mandated to monitor the associated PUR SS window Additional Enhancements for NB-IoT Agreement For dedicated PUR in idle mode and for HD-FDD UEs, the start of the PUR SS Window is [x] subframes after the end PUR transmission FFS: Value of x, and if x is fixed or signaled FFS: Support for monitoring of PUR SS Window before PUR transmission Note: The PUR SS Window is the time period where the UE monitors the NPDCCH for at least a time period after a PUR transmission Agreement NPDCCH candidates are determined by USS like search space FFS: Other details on the USS like search space Type2-CSS can also be discussed as part of the FFS Conclusion CBS PUR is not supported in Rel-16

For Further Discussion

Aspects related to notifying eNB of unused PUR resources.

Potential enhancements of power control mechanisms for PUR. (The baseline is the existing NB-IoT open loop power control.)

Text related to RAN2 agreements for 2-step RACH in NR discussed in 3GPP TSG RAN2 #106 Chairman's Notes are quoted below:

Agreements

1. From RAN2 perspective, 2-step RACH selections can be based on indicating to all UEs via SIB, or dedicated configuration in RRC_CONNECTED/INACTIVE/IDLE states. FFS if radio quality is used for 2-step RACH selection.
2. From RAN2 perspective, for msgA retransmission (i.e. preamble and PUSCH) we assume that the UE retries on 2-step RACH
3. FFS whether the UE can fallback to 4-step RACH after certain time. Ask RAN1 whether the preamble transmission performance for 2-step RACH and 4-step RACH is the same.
4. For MsgA with C-RNTI, the UE shall monitor the PDCCH addressed to C-RNTI for success response and msgB-RNTI (e.g. RA-RNTI or new RNTI)
5. Contention Resolution:
    a. If the PDU PDCCH addressed to the C-RNTI (i.e. C-RNTI included in MsgA) containing the 12 bit TA command is received, the UE should consider the contention resolution to be successful and stop the reception of MsgB or with UL grant if the UE is synchronized already.
    b. If the corresponding fallback RAR is detected, the UE should stop the monitoring of PDCCH addressed to the corresponding C-RNTI for success response and process the fallback operation accordingly.
    c. If neither corresponding fallback RAR nor PDCCH addressed C-RNTI is detected within the response window, the UE should consider the msgA attempt failed and do back off operation based on the backoff indicator if received in MsgB.
    d. FFS if a new MAC CE with 12 bits Timing Advanced Command shall be introduced
6. For CCCH, MsgB can include the SRB RRC message. The format should be designed for both with and without RRC message.
7. For CCCH, for success or fallback RAR MsgB can multiplex messages for multiple UEs. FFS if we can multiplex SRB RRC messages of multiple UEs.
8. Network response to msgA (i.e. msgB/msg2) can include the following:
    a. SuccessRAR
    b. FallbackRAR
    c. Backoff Indication
FFS: format of successRAR and whether successRAR is split into more than one message and format of fallbackRAR and whether legacy msg2 can be reused for fallbackRAR
9. Proposal 10: The following fields can be included in the successRAR when CCCH message is included in msgA.
    a. Contention resolution ID
    b. C-RNTI
    c. TA command
10. Upon receiving the fallbackRAR, the UE shall proceed to msg3 step of 4-step RACH procedure
11. FallbackRAR should contain the following fields
    a. RAPID
    b. UL grant (to retransmit the msgA payload). FFS on restrictions on the grant and UE behavior if different grant and rebuilding
    c. TC-RNTI
    d. TA command
12. From RAN2 perspective, no further offset is needed for the start of msgB monitoring window (i.e. no offset is needed to cover the RRC processing delay and/or F1 delay).
13. The UE will monitor for response message using the single msgB agreed window
14. MsgB containing the successRAR shall not be multiplexed with the legacy 4-step RACH RAR in the same MAC PDU In various embodiments disclosed herein, a User Equipment (UE) could be an Machine-Type Communications (MTC) UE or a Narrow Band Internet of Things (NB-IoT) UE. "Bandwidth reduced and Low complexity UEs (BL UEs)" and/or "UEs in enhanced coverage (UEs in EC, UEs in CE, CE UEs)" could be referred to as "MTC UE". In a RRC_IDLE state, if the UE initiates a Random Access (RA) procedure, this RA procedure may be for Early-Data Transmission (EDT) or may not be for EDT. In a RRC_IDLE state, if the UE initiates a RA procedure, this RA procedure may be for a Mobile-terminated EDT (MT-EDT) or may not be for MT-EDT. When referring to Physical Downlink Control Channel (PDCCH), it may be MTC Physical Downlink Control Channel (MPDCCH) for MTC UEs or Narrowband Physical Downlink Control Channel (NPDCCH) for NB-IoT UEs. When referring to Physical Random Access Channel (PRACH), it may be PRACH for MTC UEs or Narrowband Physical Random Access Control Channel (NPRACH) for NB-IoT UEs. The statements in this paragraph may be applied to LTE (i.e., 4G technology). The statements described above in this paragraph could be generally applied to all the following paragraphs, unless otherwise specified.

A contention-based RA procedure may comprise four steps (e.g., a 4-step RACH/RA procedure), wherein the messages transmitted or received in each of these four steps may be referred to as "Msg1", "Msg2", "Msg3", and "Msg4". A contention-based RA procedure may comprise two steps (e.g., a 2-step RACH/RA procedure), wherein the messages transmitted or received in each of these two steps may be referred to as "MsgA" and "MsgB". A non-contention-based RA procedure may comprise two steps, wherein the messages transmitted or received in each of these two steps may be referred to as "Msg1", and "Msg2". The statement(s) described above in this paragraph could be generally applied to all the following paragraphs, unless otherwise specified.

NR_Lite (namely NR_Light, NR-IoT) is likely to be introduced in NR Release 17. NR_Lite may target mid-end/high-end IoT devices (e.g., industrial sensors and surveillance cameras), and LTE MTC & NB-IoT and NR mMTC target low-end IoT devices. Compared to LTE MTC and NB-IoT, NR_Lite may have higher data rate and lower latency but at the cost of higher device complexity/cost. Compared to New Radio enhanced Mobile Broadband (NR eMBB), NR_Lite may have lower device complexity/cost but lower data rate and higher latency. In terms of battery life, NR_Lite may have longer battery life than NR eMBB but shorter than LTE MTC and NB-IoT. A new UE capability may be defined for NR_Lite UE. It is assumed that NR_Lite UE may connect to NR Node B (gNB) rather than evolved Node B (eNB). It is assumed that a NR_Lite UE may support at least some of the NR techniques, which may include, for example, Bandwidth part (BWP) operation, beam operation, Supplementary Uplink (SUL) operation. It is assumed that a RA procedure in NR_Lite may be similar to the current NR RA procedure as disclosed in this this specification. SUL can be configured to improve Uplink (UL) coverage for high frequency scenarios. With SUL, the UE is configured with 2 ULs for one Downlink (DL) of the same Serving cell. The other ULs (i.e., not SULs) among the 2 ULs are called Normal Uplink (NUL).

To support NR_lite devices (or NR_lite UEs) in NR, some mechanism to improve transmission efficiency and reduce power consumption may be introduced in NR. For example, NR may introduce a mechanism similar to Preconfigured Uplink Resources (PUR) in LTE MTC or NB-IoT. For example, while the UE is in a RRC_IDLE state or RRC_INACTIVE state and there is UL data available for transmission, the UE could transmit the UL data using PUR instead of initiating a RA procedure. The UE could monitor PDCCH for receiving a Network (NW) response (for PUR) after transmitting the UL data using PUR. The NW response could be an Acknowledgement/Negative Acknowledgement (ACK/NACK) indication. The NW response could be a UL grant scheduling retransmission of the UL data. The NW response could be a DL assignment scheduling DL data, and the UE receives the corresponding DL data according to the DL assignment. After receiving the NW response (for PUR), the UE may stay in a RRC_IDLE or RRC_INACTIVE state. After receiving the NW response (for PUR), the UE may enter RRC_CONNECTED state (e.g., in case the DL data includes RRCSetup or RRCResume message).

Before the UE performs a UL transmission, the UE may determine whether or not the UL data could be transmitted using PUR based on some conditions. The UL data may include a Radio Resource Control (RRC) message (e.g., RRCSetupRequest, RRCResumeRequest, RRCEarlyDataRequest). The UL data may include data coming from the application layer. The UE may not initiate a RA procedure if the UE determines that the UL data could be transmitted using PUR. The UE may initiate a RA procedure if the UE determines that the UL data could not be transmitted using PUR. The UE may initiate a RRC connection establishment procedure and transmits the RRC message (e.g., RRCSetupRequest) during a RA procedure if the UE determines that the UL data could not be transmitted using PUR. The UE may initiate a RRC connection resume procedure and transmits the RRC message (e.g., RRCResumeRequest) during a RA procedure if the UE determines that the UL data could not be transmitted using PUR. The UE may initiate a RRC connection establishment procedure and transmits the RRC message (e.g., RRCSetupRequest) using PUR if at least the RRC message could be transmitted using PUR. The UE may initiate a RRC connection resume procedure and transmits the RRC message (e.g., RRCResumeRequest) using PUR if at least the RRC message could be transmitted using PUR.

The conditions may include whether the (potential) data size of the UL data is not larger than a threshold (and the threshold may be predefined or configured in the PUR configuration). The conditions may include whether the service type of the UL data is a specific service type (e.g., data from a configured logical channel). The conditions may include whether the establishment cause is a specific establishment cause (e.g., mo-Data). The conditions may include whether the Serving Cell (on which the UE camps) supports PUR (e.g., indicated in the system information). The conditions may include whether the UE has a PUR configuration. The PUR configuration may include time/frequency resource information for PUR. The PUR configuration may include parameters related to Timing Advance (TA) validation for PUR. The PUR configuration may include parameters related to PDCCH monitoring for PUR. The UE may receive the PUR configuration from the NW while the UE is in a RRC_CONNECTED state. The UE may receive the PUR configuration from the NW in the DL data after performing the UL transmission using PUR. The conditions may include whether or not TA is valid for PUR. The UE determines whether or not TA is valid for PUR according to the PUR configuration. The UE may consider the TA for PUR to be valid if (at least) a TA timer (for PUR) is running. The UE may consider the TA for PUR to be valid if (at least) the measured Reference Signal Received Power (RSRP) of the Serving Cell is above (or not below) a threshold (and the threshold could be predefined or configured in the PUR configuration). The conditions may include whether or not the next occurred PUR occasion is not too far away in the time domain (e.g., the UE may determine whether or not the UL data could be transmitted using PUR if the time duration from the determination to the next occurred PUR occasion is smaller (or not larger) than a threshold, and the threshold may be predefined or configured in the PUR configuration). The conditions may include whether or not the time duration between current available PUR occasion and next available PUR occasion is smaller (or not larger) than a threshold (and the threshold may be included in the PUR configuration). The UE determines the next PUR occasion according to the PUR configuration. The UE performs transmission using PUR on the PUR occasion.

If the UE determines that the UL data could be transmitted using PUR based on at least one of the above listed conditions, the UE may consider that there is an available PUR or the PUR is available. If the UE determines that the UL data could not be transmitted using PUR based on at least one of the above listed conditions, the UE may consider that there is no available PUR or the PUR is not available. If the UE determines that at least the RRC message could be transmitted using PUR based on at least one of the above listed conditions, the UE may consider that there is available PUR or the PUR is available.

The PUR could be a dedicated PUR. From the UE's perspective, "dedicated PUR" may imply that the UL resource is not shared with another UE, and the NW could identify which UE is performing the transmission using this dedicated PUR. The UE does not expect any conflict/collision with other UEs when performing transmission using the dedicated PUR. There is no Contention Resolution required for the dedicated PUR transmission.

In NR, if UE (and/or NW) supports beam operation or if UE (and/or NW) is operated in Frequency Range 2 (FR2), UL and/or DL resources for a UE may be associated with a certain beam at a time (e.g., the same resources could be reused in another beam for another UE). During a RA procedure, the UE selects a beam for performing the subsequent UL/DL transmission according to the measured RSRP of the reference signal (e.g., SS/PBCH block (SSB), Channel State Information Reference Signal (CSI-RS)). After the UE enters RRC_CONNECTED state, the UE may be indicated or configured to a perform beam report (e.g., report for L1-RSRP and/or DL RS index) by the NW, and report (corresponding) measurements to the NW. The NW may adjust the beam(s) which the UE should use. The NW may indicate or change of TCI (Transmission Configuration Indication) state or QCL (Quasi Co-Location) assumption of a DL channel/RS transmission to the UE. In the case of a dedicated PUR, it is also possible that the dedicated PUR is associated with a certain beam(s) when the NW configures PUR to the UE. In other words, an association of the dedicated PUR with one or multiple beams may be configured in the PUR configuration.

Before performing a new UL transmission, the UE may need to select a beam for performing the corresponding transmission. For example, some beams are associated with the PUR while others are not associated. For example, some beams are with a valid TA while others are not with a valid TA. For example, a beam not associated with a PUR is more suitable (e.g., has better quality) than a beam associated with PUR. How the UE performs the selection needs to be specified, otherwise the UE may not be able to perform a (successful) transmission.

The UE may select a beam based on whether or not the beam is associated with PUR. For example, the UE selects a beam which is associated with PUR. Alternatively or additionally, the UE does not select a beam which is not associated with PUR. Upon performing the selection, the UE may further consider at least one of the following factors:

a. Quality (e.g. qualified or not qualified) associated with the beam

The quality may be RSRP quality. The UE may determine that a beam is qualified if the measured RSRP of this beam is above (or not below) a threshold. The UE may determine that a beam is qualified if the measured RSRP of this beam is the highest among the measured RSRP of all beams.

For example, a qualified beam may be selected. For example, a not qualified beam may not be selected.

b. Timing Advance (e.g. valid or invalid) associated with the beam

For example, a beam with valid TA may be selected. For example, a beam with invalid TA may not be selected.

c. Coverage level/mode of the beam

For example, a beam with smaller coverage level number may be selected. For example, a beam with larger coverage level number may not be selected. A smaller coverage level number may imply better radio condition. A larger coverage level number may imply worse radio condition. The UE may determine the current coverage level based on comparing the measured RSRP with a list of RSRP thresholds. The UE may apply different parameters (e.g. number of repetitions) when the UE is in different coverage level.

d. Time to the next occurred PUR occasion (e.g., not too far away or too far away)

For example, a beam may be selected if time duration (from now) to the next PUR occasion is smaller than a threshold. For example, a beam may not be selected if time duration (from now) to the next occurred PUR occasion is equal to or larger than a threshold. Each PUR occasion may be associated with at least one but not all beams. Each PUR occasion may be associated with all beams.

e. Coverage level/mode of the UE

For example, a beam may be selected if the UE considers itself to be in a coverage level associated with PUR. For example, a beam may not be selected if the UE considers itself to be in a coverage level not associated with PUR.

The UE could perform the selection by combining (1) whether or not the beam is associated PUR and (2) any one of the aforementioned factors. For example, the UE selects the beam with best quality among the beams associated with PUR. The UE could perform the selection by combining (1) whether or not the beam is associated PUR and (2) some of the aforementioned factors, with a specific order.

Some examples of the specific order are listed below. Any additional step(s) may be inserted before or after any of the steps in each example to form another example. Any existing step(s) in each example may be removed to form another example. If the UE determines that the UE could not perform a PUR transmission in a step, the UE may not perform the remaining step(s). Otherwise, the UE may continue performing the remaining step(s).

Example 1 of the Specific Order

The UE determines whether or not the next occurred PUR occasion is not too far away. If the UE determines that the next occurred PUR occasion is too far away, the UE could not perform a PUR transmission and may initiate a RA procedure.

After the previous step, the UE excludes the beam(s) that is not qualified. If no beam remains (i.e., all beams are excluded), the UE could not perform a PUR transmission and may initiate a RA procedure.

After the previous step, the UE determines whether the UE is in a coverage level/mode associated with PUR. If the UE determines that the UE is in a coverage level not associated with PUR, the UE could not perform a PUR transmission and may initiate a RA procedure.

After the previous step, the UE excludes the beam(s) that is not associated with PUR. If no beam remains (i.e. all beams are excluded), the UE could not perform a PUR transmission and may initiate a RA procedure.

After the previous step, the UE excludes the beam(s) that is not associated with a valid TA. If no beam remains (i.e. all beams are excluded), the UE could not perform a PUR transmission and may initiate a RA procedure.

Example 2 of the Specific Order

The UE determines whether or not the next occurred PUR occasion is not too far away. If the UE determines that the next occurred PUR occasion is too far away, the UE could not perform a PUR transmission and may initiate a RA procedure.

After the previous step, the UE excludes the beam(s) that is associated with a worse coverage level (e.g., level 1) if there is at least a beam associated with a better coverage level (e.g., level 0). If no beam remains (i.e., all beams are excluded), the UE could not perform a PUR transmission and may initiate a RA procedure.

After the previous step, the UE excludes the beam(s) that is not qualified. If no beam remains (i.e., all beams are excluded), the UE could not perform a PUR transmission and may initiate a RA procedure.

After the previous step, the UE excludes the beam(s) that is not associated with PUR. If no beam remains (i.e., all beams are excluded), the UE could not perform a PUR transmission and may initiate a RA procedure.

After the previous step, the UE excludes the beam(s) that is not associated with a valid TA. If no beam remains (i.e. all beams are excluded), the UE could not perform a PUR transmission and may initiate a RA procedure.

Example 3 of the Specific Order

The UE determines whether or not the next occurred PUR occasion is not too far away. If the UE determines that the next occurred PUR occasion is too far away, the UE could not perform a PUR transmission and may initiate a RA procedure.

After the previous step, the UE excludes the beam(s) that is associated with a worse coverage level (e.g., level 1) if there is at least a beam associated with a better coverage level (e.g., level 0). If no beam remains (i.e., all beams are excluded), the UE could not perform a PUR transmission and may initiate a RA procedure.

After the previous step, the UE excludes the beam(s) that is not qualified. If no beam remains (i.e., all beams are excluded), the UE could not perform a PUR transmission and may initiate a RA procedure.

After the previous step, the UE excludes the beam(s) that is not associated with a valid TA. If no beam remains (i.e., all beams are excluded), the UE could not perform a PUR transmission and may initiate a RA procedure.

After the previous step, the UE excludes the beam(s) that is not associated with PUR. If no beam remains (i.e. all beams are excluded), the UE could not perform a PUR transmission and may initiate a RA procedure.

Example 4 of the Specific Order

The UE determines whether or not the next occurred PUR occasion is not too far away. If the UE determines that the next occurred PUR occasion is too far away, the UE could not perform a PUR transmission and may initiate a RA procedure.

After the previous step, the UE excludes the beam(s) that is not qualified. If no beam remains (i.e., all beams are excluded), the UE could not perform a PUR transmission and may initiate a RA procedure.

After the previous step, the UE excludes the beam(s) that is associated with a worse coverage level (e.g., level 1) if there is at least a beam associated with a better coverage level (e.g., level 0). If no beam remains (i.e., all beams are excluded), the UE could not perform a PUR transmission and may initiate a RA procedure.

After the previous step, the UE excludes the beam(s) that is not associated with PUR. If no beam remains (i.e., all beams are excluded), the UE could not perform a PUR transmission and may initiate a RA procedure.

After the previous step, the UE excludes the beam(s) that is not associated with valid TA. If no beam remains (i.e., all beams are excluded), the UE could not perform a PUR transmission and may initiate a RA procedure.

Example 5 of the Specific Order

The UE determines whether or not the next occurred PUR occasion is not too far away. If the UE determines that the next occurred PUR occasion is too far away, the UE could not perform a PUR transmission and may initiate a RA procedure.

After the previous step, the UE excludes the beam(s) that is not qualified. If no beam remains (i.e., all beams are excluded), the UE could not perform a PUR transmission and may initiate a RA procedure.

After the previous step, the UE excludes the beam(s) that is associated with a worse coverage level (e.g., level 1) if there is at least a beam associated with a better coverage level (e.g., level 0). If no beam remains (i.e., all beams are excluded), the UE could not perform a PUR transmission and may initiate a RA procedure.

After the previous step, the UE excludes the beam(s) that is not associated with a valid TA. If no beam remains (i.e., all beams are excluded), the UE could not perform a PUR transmission and may initiate a RA procedure.

After the previous step, the UE excludes the beam(s) that is not associated with PUR. If no beam remains (i.e., all beams are excluded), the UE could not perform a PUR transmission and may initiate a RA procedure.

Example 6 of the Specific Order

The UE determines whether or not the next occurred PUR occasion is not too far away. If the UE determines that the next occurred PUR occasion is too far away, the UE could not perform a PUR transmission and may initiate a RA procedure.

After the previous step, the UE determines whether the UE is in a coverage level/mode associated with PUR. If the UE determines that the UE is in a coverage level not associated with PUR, the UE could not perform a PUR transmission and may initiate a RA procedure.

After the previous step, the UE excludes the beam(s) that is not associated with PUR. If no beam remains (i.e., all beams are excluded), the UE could not perform a PUR transmission and may initiate a RA procedure.

After the previous step, the UE excludes the beam(s) that is not associated with a valid TA. If no beam remains (i.e., all beams are excluded), the UE could not perform a PUR transmission and may initiate a RA procedure.

After the previous step, the UE excludes the beam(s) that is not qualified. If no beam remains (i.e., all beams are excluded), the UE could not perform a PUR transmission and may initiate a RA procedure.

After the UE performs the selection (e.g., according to a specific order listed above), if at least one beam remains, the UE could perform a PUR transmission (e.g. using one or more of the at least one beam). If more than one beam remains, the UE may randomly select a beam among the remaining beams. If more than one beam remains, the UE may select a beam with best quality (e.g., highest measured RSRP) among the remaining beams.

Some detailed examples corresponding to different specific orders are listed below. One or more additional step(s) may be inserted before or after any of the steps in each example to form another example. One or more specified step(s) in each example may be removed to form another example.

For a first example, the UE (1) determines that the next occurred PUR occasion is not too far away, (2) selects the qualified beam(s) as a first set, (3) determines that the UE is in a coverage level/mode associated with PUR and selects (from the first set) the beam(s) associated with PUR as a second set, and (4) selects (from the second set) the beam(s) with a valid TA as a final set.

For a second example, the UE (1) selects the qualified beam(s) as a first set, (2) determines that the UE is in a coverage level/mode associated with PUR and selects (from the first set) the beam(s) associated with PUR as a second set, and (3) selects (from the second set) the beam(s) with a valid TA as a final set.

For a third example, the UE (1) determines that the next occurred PUR occasion is not too far away, (2) selects the beam(s) with smaller (better) coverage level/mode as a first set, (3) selects (from the first set) the qualified beam(s) as a second set, (4) selects (from the second set) the beam(s) associated with PUR as a third set, and (5) selects (from the third set) the beam(s) with a valid TA as a final set.

For a fourth example, the UE (1) determines that the next occurred PUR occasion is not too far away, (2) selects the beam(s) with smaller (better) coverage level/mode as a first set, (3) selects (from the first set) the qualified beam(s) as a second set, (4) selects (from the second set) the beam(s) with valid TA as a third set, and (5) selects (from the third set) the beam(s) associated with PUR as a final set.

For a fifth example, the UE (1) determines that the next occurred PUR occasion is not too far away, (2) selects the qualified beam(s) as a first set, (3) selects (from the first set) the beam(s) with smaller (better) coverage level/mode as a second set, (4) selects (from the second set) the beam(s) associated with PUR as a third set, and (5) selects (from the third set) the beam(s) with valid TA as a final set.

For a sixth example, the UE (1) determines that the next occurred PUR occasion is not too far away, (2) selects the qualified beam(s) as a first set, (3) selects (from the first set) the beam(s) with smaller (better) coverage level/mode as a second set, (4) selects (from the second set) the beam(s) with valid TA as a third set, and (5) selects (from the third set) the beam(s) associated with PUR as a final set.

For a seventh example, the UE (1) selects the beam(s) with smaller (better) coverage level/mode as a first set, (2) selects (from the first set) the qualified beam(s) as a second set, (3) selects (from the second set) the beam(s) associated with PUR as a third set, and (4) selects (from the third set) the beam(s) with valid TA as a final set.

For a eighth example, the UE (1) selects the beam(s) with smaller (better) coverage level/mode as a first set, (2) selects (from the first set) the qualified beam(s) as a second set, (3) selects (from the second set) the beam(s) with a valid TA as a third set, and (4) selects (from the third set) the beam(s) associated with PUR as a final set.

For a ninth example, the UE (1) selects the qualified beam(s) as a first set, (2) selects (from the first set) the beam(s) with smaller (better) coverage level/mode as a second set, (3) selects (from the second set) the beam(s) associated with PUR as a third set, and (4) selects (from the third set) the beam(s) with a valid TA as a final set.

For a tenth example, the UE (1) selects the qualified beam(s) as a first set, (2) selects (from the first set) the beam(s) with smaller (better) coverage level/mode as a second set, (3) selects (from the second set) the beam(s) with valid TA as a third set, and (4) selects (from the third set) the beam(s) associated with PUR as a final set.

For a eleventh example, the UE (1) determines that the next occurred PUR occasion is not too far away, (2) determines that the UE is in a coverage level/mode associated with PUR and selects the beam(s) associated with PUR as a first set, (3) selects (from the first set) the beam(s) with a valid TA as a second set, and (4) selects (from the second set) the qualified beam(s) as a final set.

For a twelfth example, the UE (1) determines that the UE is in a coverage level/mode associated with PUR and selects the beam(s) associated with PUR as a first set, (2) selects (from the first set) the beam(s) with valid TA as a second set, and (3) selects (from the second set) the qualified beam(s) as a final set.

The UE could perform a PUR transmission if the final set includes (at least) a beam. The UE could not perform a PUR transmission and may initiate a RA procedure if the final set does not include any beam. If the final set includes more than one beam, the UE may randomly select a beam from the final set. If the final set includes more than one beam, the UE may select a beam with best quality (e.g., highest measured RSRP) from the final set.

The UE may perform the aforementioned beam selection in response to UL data becoming available (in RRC_IDLE or RRC_INACTIVE state). The UE may perform the aforementioned beam selection in response to triggering a Buffer Status Report (BSR) (in RRC_IDLE or RRC_INACTIVE state). The UE may perform the aforementioned beam selection in response to determining that the PUR is available. The UE may perform the aforementioned beam selection in response to receiving a UL grant for PUR (re-) transmission.

In another aspect, after at least a beam is selected for the initial PUR transmission, an issue may occur if the selected beam(s) becomes no longer suitable before the PUR transmission is successfully completed. Since the NW configures a dedicated PUR to the UE according to the channel and/or beam quality while the UE is in RRC_CONNECTED state, after the UE enters a RRC_IDLE or RRC_INACTIVE state, the associated beam may become unsuitable (e.g., the quality of the associated beam becomes worse due to interference from other UEs or obstacles in the environment) at any time. As the result, the UE may not be able to perform a successful transmission using PUR. The associated beam may become unsuitable in each of the following cases:

1. During a PUR transmission attempt (e.g., during a transmission bundle)

It is possible that NR_Lite supports repetition for PUR. Repetition could increase the reliability of UL/DL transmission and/or increase the cell coverage. For example, if the number of repetitions for transmission using PUR is 16 for a UE and each repetition occupies one slot, the UE will transmit the UL data using PUR in 16 slots within a PUR transmission bundle. Before the transmission (in the first slot among the 16 slots) starts, the UE may select one beam for the PUR transmission based on whether or not (at least) a beam associated with PUR is suitable. It is possible that the selected beam becomes not suitable during the repetitions.

In response to that the selected beam becomes not suitable during the repetitions of a PUR transmission, the UE may perform at least one of the following actions:
a. Stop the remaining repetition(s)
   If the selected beam becomes not suitable, the remaining repetition(s) may not be successfully received by the NW. To avoid interference to other UEs and/or unnecessary power consumption, the UE could stop the remaining repetition(s).
b. Continue the remaining repetition(s) using the selected beam
   The selected beam may temporarily become not suitable and may have impact on some but not all of the remaining repetitions. Thus, the UE could continue the remaining repetition(s) without changing the beam.
c. Continue the remaining repetition(s) using a second beam
   To ensure successful transmission, if there is a second beam other than the (previously) selected beam which is suitable and associated with PUR, the UE could select the second beam and then continue the remaining repetition(s) using the second beam.
   The UE could perform the selection based on the alternatives for selecting beam mentioned above. For example, the UE selects a beam which is the most suitable beam among the beams that are associated with PUR.
d. Cancel the PUR procedure
   The UE could cancel the PUR procedure upon stopping the remaining repetition(s). Alternatively, the UE could cancel the PUR procedure upon the last repetition of the PUR transmission.
   Additionally, the UE could keep the PUR configuration in response to canceling the PUR procedure. Alternatively, the UE could release the PUR configuration in response to canceling the PUR procedure.
e. Initiate a RA procedure
   The UE could initiate the RA procedure upon stopping the remaining repetition(s). Alternatively, the UE could initiate the RA procedure upon the last repetition of the PUR transmission.
   If a MAC PDU for transmission using PUR has been constructed, the UE could transmit a MsgA and/or Msg3 during the RA procedure without updating the Medium Access Control Protocol Data Unit (MAC PDU) or constructing a new MAC PDU. If a MAC PDU for transmission using PUR has been constructed, the UE could transmit a MsgA and/or Msg3 during the RA procedure by updating the MAC PDU. If a MAC PDU for transmission using PUR has been constructed, the UE could transmit a MsgA and/or Msg3 during the RA procedure by discarding the MAC PDU and constructing a new MAC PDU. Additionally, whether or not the UE updates the MAC PDU or reconstructs a new MAC PDU could depend on the Transport Block (TB) size of PUR and the TB size of MsgA and/or Msg3.
   Additionally, the UE could keep the PUR configuration in response to initiating the RA procedure. Alternatively, the UE could release the PUR configuration in response to initiating the RA procedure.
   Additionally, in the RA Resource selection procedure, the UE selects the preamble group A/B based on the TB size of the MAC PDU constructed for PUR, instead of based on the UL data size. For example, if the TB size of the MAC PDU is greater than ra-Msg3SizeGroupA, the UE selects preamble group B. For example, if the TB size of the MAC PDU is not greater than ra-Msg3SizeGroupA, the UE selects preamble group A.
f. Consider TA (for PUR) to be invalid
   A way to stop using PUR is to consider that the TA (for PUR) to be invalid. The UE could consider that the TA of the selected beam to be invalid. The UE could consider that the TA of all beams associated with PUR to be invalid.
   The UE may stop the TA timer (for PUR). The UE may consider the TA timer (for PUR) as expired and perform the corresponding actions upon timer expiry.

2. Before a PUR retransmission (e.g., in case the previous PUR transmission is not successful)
   It is possible that a PUR transmission attempt is not successful. The UE may determine that the (previous) PUR transmission attempt not successful if the received NW response is a NACK indication or UL grant for PUR retransmission, or the UE does not receive any NW response during a (configured) time period. The PUR retransmission may be performed at the next PUR occasion. The PUR retransmission may be performed based on the received UL grant for PUR retransmission. It is possible that the (previously) selected beam becomes not suitable before the PUR retransmission take place.
   In response to that the (previously) selected beam becomes not suitable before the PUR retransmission takes place, the UE may perform at least one of the following actions:
   a. Select a second beam which is associated with PUR
      To ensure successful transmission, if there is a second beam other than the (previously) selected beam which is suitable and associated with PUR, the UE could select the second beam. After selecting the second beam, the UE could perform the PUR retransmission using the second beam.
      The UE could perform the selection based on the alternatives for selecting beam mentioned above. For example, the UE selects a beam which is the most suitable beam among the beams that are associated with PUR.
   b. Continue using the previously selected beam
      The selected beam may temporarily become not suitable and may have impact on some but not all of the repetitions. Thus, the UE could continue using the previously selected beam for performing the PUR retransmission.
   c. Cancel the PUR procedure
      The UE could cancel the PUR procedure in response to that the previously selected beam becomes not suitable.
      Additionally, the UE could keep the PUR configuration in response to canceling the PUR procedure. Alternatively, the UE could release the PUR configuration in response to canceling the PUR procedure.
   d. Initiate a RA procedure
      The UE could initiate the RA procedure in response to that the previously selected beam becomes not suitable.
      If a MAC PDU for transmission using PUR has been constructed, the UE could transmit a MsgA and/or Msg3 during the RA procedure without updating the MAC PDU or constructing a new MAC PDU. If a MAC PDU for transmission using PUR has been constructed, the UE could transmit a MsgA and/or Msg3 during the RA procedure by updating the MAC PDU. If a MAC PDU for transmission using PUR has been constructed, the UE could transmit a MsgA and/or Msg3 during the RA procedure by discarding the MAC PDU and constructing a new MAC PDU. Additionally, whether or not the UE updates the MAC PDU or reconstructs a new MAC PDU could depend on the TB size of PUR and the TB size of MsgA and/or Msg3.

Additionally, the UE could keep the PUR configuration in response to initiating the RA procedure. Alternatively, the UE could release the PUR configuration in response to initiating the RA procedure. Additionally, in the RA Resource selection procedure, the UE selects the preamble group A/B based on the TB size of the MAC PDU constructed for PUR, instead of based on the UL data size. For example, if the TB size of the MAC PDU is greater than ra-Msg3SizeGroupA, the UE selects preamble group B. For example, if the TB size of the MAC PDU is not greater than ra-Msg3SizeGroupA, the UE selects preamble group A.

e. Consider TA (for PUR) to be invalid

A way to stop using PUR is to consider that the TA (for PUR) to be invalid. The UE could consider that the TA of the previously selected beam to be invalid. The UE could consider that the TA of all beams associated with PUR to be invalid.

The UE may stop the TA timer (for PUR). The UE may consider the TA timer (for PUR) as expired and perform the corresponding actions upon timer expiry.

In the various embodiments, a beam could be a NW beam, UE beam, a transmission beam, or a reception beam.

A "selecting a beam" could mean that the UE selects a DL reference signal (DL RS), and then derives the beam from the selected DL RS (e.g., based on an association between beam and DL RS). The DL RS could be a SSB. The DL RS could be CSI-RS. The DL RS could be DM-RS. The DL RS could be a new type of DL RS introduced for NR_Lite. One beam may be associated with one DL RS. One beam may be associated with more than one DL RS. More than one beam may be associated with one DL RS. One beam may be associated with transmission or reception of the DL RS.

"A beam is suitable" or "a beam becomes suitable" could mean that the UE expects that a transmission (to be performed) may be successful if using this beam. "A beam is not suitable" or "a beam becomes not suitable" could mean that the UE expects that a transmission (to be performed) may not be successful if using this beam. The UE may select a suitable beam for performing a transmission. The UE may not select a "not suitable" beam for performing a transmission. The UE may determine that a beam is and/or becomes suitable or not suitable based on the quality (e.g., measured RSRP/RSRQ value) of this beam. The UE may derive the measured RSRP/RSRQ value of this beam from the measured RSRP/RSRQ value of the DL RS(s) associated with this beam. A suitable beam may be associated with PUR. A suitable beam may not be associated with PUR. A beam may be suitable or not suitable. A beam may be associated with PUR or may not be associated with PUR.

"A beam is suitable" or "a beam becomes suitable" could mean that the measured result (may be in metric of, e.g. RSRP) of this beam is above (or not below) a threshold. "A beam is suitable" or "a beam becomes suitable" could mean that the measured result (may be in metric of, e.g. RSRP) of this beam is the highest among the measured result (may be in metric of, e.g. RSRP) of all beams (i.e. this beam is the best beam). "A beam is suitable" or "a beam becomes suitable" could mean that the Timing Advance (TA) associated with this beam is considered to be (or becomes) valid.

"A beam is not suitable" or "a beam becomes not suitable" could mean that the measured result (may be in metric of, e.g., RSRP) of this beam is below (or not above) a threshold. "A beam is not suitable" or "a beam becomes not suitable" could mean that the measured result (may be in metric of, e.g., RSRP) of this beam is less than the measured result (may be in metric of, e.g. RSRP) of another beam (i.e., the selected beam is not the best beam). The another beam may be associated with PUR. The another beam may not be associated with PUR. "A beam is not suitable" or "a beam becomes not suitable" could mean that the Timing Advance (TA) associated with this beam is considered to be (or becomes) invalid.

Throughout this disclosure, a beam could mean or be referred to as that a TCI state, (spatial) QCL assumption, spatial filter, or spatial parameter, which is associated with or used to receive a DL transmission (e.g., DL channel, DL RS) or a UL transmission (e.g., UL channel, UL RS).

Throughout this disclosure, a beam could mean or be referred to as that a spatial relation, spatial filter, spatial parameter, transmission precoder, which is associated with or used to transmit a UL transmission (e.g., UL channel, UL RS) or a DL transmission (e.g., DL channel, DL RS).

Throughout this disclosure, a beam could be referred to a SSB or a DL RS.

Throughout this disclosure, a beam associated with a resource (e.g., RA resource, PUR resource) could be referred to a SSB or DL RS associated with the resource.

The threshold could be the RSRP threshold in a TA validation for PUR. The threshold could be a RSRP threshold for determining whether or not a beam is suitable (or qualified). The threshold could be the RSRP threshold for a beam selection in the RA procedure (e.g. rsrp-ThresholdSSB). The threshold could be the threshold for determining coverage level (associated with PUR or of the UE).

If the UE determines to initiate a RA procedure while the UE keeps the PUR configuration, the UE may apply the transmission power of PUR to Msg1 and/or Msg3 and/or MsgA transmission. The transmission power of PUR is included in the PUR configuration.

According to one exemplary method for selecting beam for preconfigured uplink resources, the method includes: selecting a beam associated with Preconfigured Uplink Resources (PUR) from a set of beams, and performing an uplink transmission using the selected beam, wherein the UE performs the uplink transmission on a PUR occasion.

In another exemplary method, the method includes: receiving a PUR configuration from a network node before selecting the beam, wherein the PUR configuration includes time and frequency information for PUR.

In another exemplary method, the UE determines the PUR occasion according to the time and frequency information for PUR.

In another exemplary method, the UE determines whether each beam in the set of beams is associated with PUR according to the PUR configuration.

In another exemplary method, the UE performs the selection in RRC_IDLE state.

In another exemplary method, the UE performs the selection in RRC_INACTIVE state.

In another exemplary method, the UE performs the selection in response to uplink data becoming available for transmission.

In another exemplary method, the UE performs the selection in response to triggering a BSR.

In another exemplary method, the UE performs the selection in response to triggering a PUR.

In another exemplary method, the UE performs the selection in response to receiving an uplink grant indicating retransmission of a transmission using PUR.

In another exemplary method, the method further includes: initiating a Random Access (RA) procedure if the UE selects a beam not associated with PUR, and performing the uplink transmission using the selected beam, wherein the UE performs the uplink transmission not on a PUR occasion.

In another exemplary method, the method further includes: selecting the beam further based on a criterion, in addition to whether the beam is associated with PUR.

In another exemplary method, the criterion at least includes the quality of the beam.

In another exemplary method, the criterion at least includes the Timing Advance (TA) associated with the beam.

In another exemplary method, the criterion at least includes the coverage level/mode of the beam.

In another exemplary method, the criterion at least includes the time to the PUR occasion associated with the beam.

In another exemplary method, the criterion at least includes the coverage level/mode of the UE.

In another exemplary method, the UE performs the selection by combining whether the beam is associated with PUR and the criterion/criteria with a specific order.

In another exemplary method, the method includes: performing a first PUR transmission using a first beam, wherein the first beam is suitable and is associated with PUR; selecting a second beam in response to that the first beam becomes not suitable, wherein the second beam is different from the first beam and is suitable and is associated with PUR; and performing a second PUR transmission using the second beam.

In another exemplary method, the second PUR transmission is a retransmission of the first PUR transmission.

In another exemplary method, the method further includes: determining whether the first beam becomes not suitable in response to determining that the first PUR transmission is not successful.

In another exemplary method, the UE determines that the first PUR transmission is not successful in response to receiving a response from a network node, and the response is received in response to performing the first PUR transmission.

In another exemplary method, the UE determines that the first PUR transmission is not successful in response to receiving nothing from a network node during a time period, wherein the UE expects to receive a response from the network node during the time period.

In another exemplary method, the second PUR transmission and the first PUR transmission are repetitions within a same PUR transmission bundle.

In another exemplary method, the method further includes: determining whether the first beam becomes not suitable periodically.

In another exemplary method, the UE determines that the beam is or becomes suitable if an at least one condition is met, and the UE determines that the beam is or becomes not suitable otherwise.

In another exemplary method, the at least one condition includes the quality of the beam.

In another exemplary method, the at least one condition includes the Timing Advance (TA) associated with the beam.

In another exemplary method, the UE performs the selection in RRC_IDLE state.

In another exemplary method, the UE performs the selection in RRC_INACTIVE state.

Figure 7:
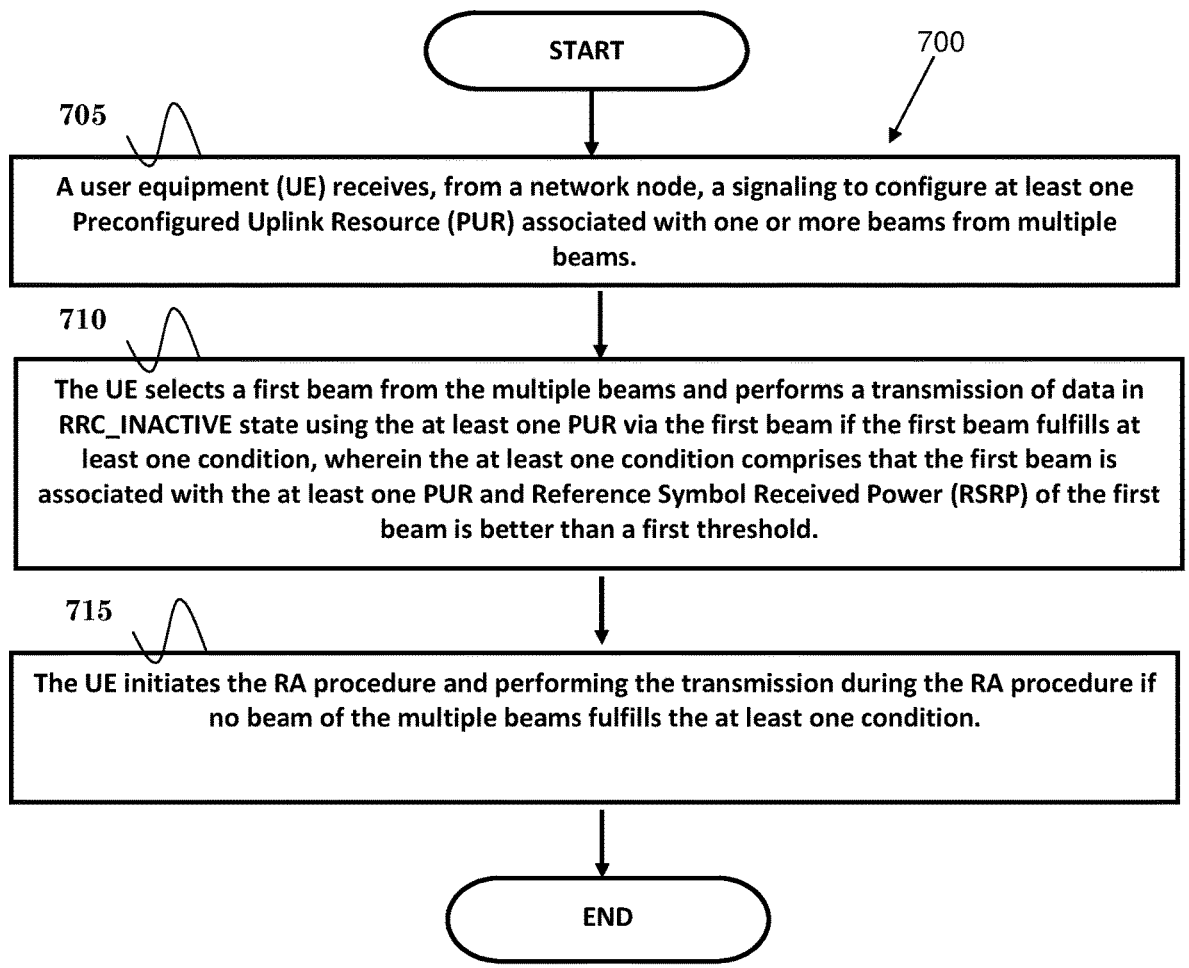
FIG. 7 is a flow diagram for one exemplary embodiment from the perspective of a User Equipment (UE).

FIG. 7 is a flow chart 700 according to one exemplary method from the perspective of a first device such as, but not limited to, a UE. In step 705, the UE receives, from a network node, a signaling to configure at least one Preconfigured Uplink Resource (PUR) associated with one or more beams from multiple beams. In step 710, the UE selects a first beam from the multiple beams and performs a transmission of data in RRC_INACTIVE state using the at least one PUR via the first beam if the first beam fulfills at least one condition, wherein the at least one condition comprises that the first beam is associated with the at least one PUR and Reference Symbol Received Power (RSRP) of the first beam is better than a first threshold. Additionally, the UE does not initiate a Random Access (RA) procedure if the first beam is selected. In step 715, the UE initiates the RA procedure and performing the transmission during the RA procedure if no beam of the multiple beams fulfills the at least one condition.

In another method, the first beam is randomly selected by the UE from a subset of the multiple beams, wherein the subset includes more than one beam that fulfills the condition.

In another method, the first beam is selected due to the best quality among a subset of the multiple beams if the subset includes more than one beam that fulfills the at least one condition.

In another method, the at least one condition comprises a valid Timing Advance (TA) associated with the first beam.

In another method, the UE receives the signaling in a RRC_CONNECTED state.

In another method, after the transmission using the at least one PUR is not successful, the UE determines whether the first beam becomes unsuitable based on the RSRP of the first beam; selects a second beam from the multiple beams to perform a retransmission of the data in the RRC_INACTIVE state if the UE determines that the first beam is unsuitable and the second beam fulfills the at least one condition; and performs the retransmission using the at least one PUR via the second beam.

In another method, the UE considers the TA associated with the first beam as invalid (e.g., if the first beam becomes unsuitable).

In another method, the UE initiates the RA procedure and performing the retransmission during the RA procedure if no beam of the multiple beams fulfills the at least one condition.

In another method, the UE determines that the first beam becomes unsuitable if the RSRP of the first beam is less than the first threshold.

In another method, the UE determines that the transmission using the at least one PUR is not successful if the UE does not receive a response of the transmission from the network node.

As those skilled in the art will appreciate, the various disclosed embodiments and/or methods may be combined to form new embodiments and/or methods.

Referring back to FIGS. 3 and 4, in one embodiment, the device 300 includes a program code 312 stored in memory 310. The CPU 308 could execute program code 312 to (i) receive, from a network node, a signaling to configure at least one Preconfigured Uplink Resource (PUR) associated with one or more beams from multiple beams, (ii) select a first beam from the multiple beams and perform a transmission of data in RRC_INACTIVE state using the at least one PUR via the first beam if the first beam fulfills at least one condition, wherein the at least one condition comprises that the first beam is associated with the at least one PUR and Reference Symbol Received Power (RSRP) of the first beam is better than a first threshold, and (iii) initiate a Random Access (RA) procedure and performing the transmission during the RA procedure if no beam of the multiple beams fulfills the at least one condition.

Furthermore, the CPU 308 can execute the program code 312 to perform all of the above-described actions and steps or others methods described herein.

The above-disclosed methods allow a UE (e.g. a NR_Lite UE) to select a beam appropriately to perform a PUR transmission in RRC_IDLE or RRC_INACTIVE state. Moreover, the UE (e.g. the NR_Lite UE) could avoid performing unsuccessful PUR transmissions or select another beam to ensure successful PUR transmission in case the originally selected beam becomes unsuitable.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the inven-

The invention claimed is:

1. A method for a User Equipment (UE), the method comprising:
receiving, from a network node, a signaling to configure at least one Preconfigured Uplink Resource (PUR) associated with multiple Synchronization Signal/Physical Broadcast Channel Blocks (SSBs);
selecting, by the UE, a first SSB from the multiple SSBs and performing a transmission of data in RRC_INACTIVE state using the at least one PUR via a first beam associated with the first SSB if the first SSB fulfills at least one condition, wherein the at least one condition comprises that Reference Symbol Received Power (RSRP) of the first SSB is above a first threshold; and
initiating a Random Access (RA) procedure and performing the transmission during the RA procedure if no SSB of the multiple SSBs fulfills the at least one condition.

2. The method of claim 1, wherein the first SSB is randomly selected by the UE from a subset of the multiple SSBs, wherein the subset includes more than one SSB that fulfills the at least one condition.

3. The method of claim 1, wherein the first SSB is selected due to a highest measured RSRP among a subset of the multiple SSBs if the subset includes more than one SSB that fulfills the at least one condition.

4. The method of claim 1, wherein the at least one condition further comprises a valid Timing Advance (TA) associated with the first beam.

5. The method of claim 1, wherein the UE receives the signaling in a RRC_CONNECTED state.

6. The method of claim 1, further comprising:
after the transmission using the at least one PUR is not successful, determining whether the first beam becomes unsuitable based on the RSRP of the first SSB;
selecting, by the UE, a second SSB from the multiple SSBs to perform a retransmission of the data in the RRC_INACTIVE state if the UE determines that the first beam is unsuitable and the second SSB fulfills the at least one condition; and
performing the retransmission using the at least one PUR via a second beam associated with the second SSB.

7. The method of claim 6, wherein the UE considers a TA associated with the first beam as invalid if the first beam becomes unsuitable.

8. The method of claim 6, further comprising:
initiating the RA procedure and performing the retransmission during the RA procedure if no SSB of the multiple SSBs fulfills the at least one condition.

9. The method of claim 6, wherein the UE determines that the first beam becomes unsuitable if the RSRP of the first SSB is less than the first threshold.

10. The method of claim 6, wherein the UE determines that the transmission using the at least one PUR is not successful if the UE does not receive a response of the transmission from the network node.

11. A User Equipment (UE), the UE comprising:
a processor; and
a memory operatively coupled to the processor,
wherein the processor is configured to execute a program code to:
receive, from a network node, a signaling to configure at least one Preconfigured Uplink Resource (PUR) associated with multiple Synchronization Signal/Physical Broadcast Channel Blocks (SSBs);
select a first SSB from the multiple SSBs and perform a transmission of data in RRC_INACTIVE state using the at least one PUR via a first beam associated with the first SSB if the first SSB fulfills at least one condition, wherein the at least one condition comprises that Reference Symbol Received Power (RSRP) of the first SSB is above a first threshold; and
initiate a Random Access (RA) procedure and perform the transmission during the RA procedure if no SSB of the multiple SSBs fulfills the at least one condition.

12. The UE of claim 11, wherein the first SSB is randomly selected by the UE from a subset of the multiple SSBs, wherein the subset includes more than one SSB that fulfills the at least one condition.

13. The UE of claim 11, wherein the first SSB is selected due to a highest measured RSRP among a subset of the multiple SSBs if the subset includes more than one SSB that fulfills the at least one condition.

14. The UE of claim 11, wherein the at least one condition further comprises a valid Timing Advance (TA) associated with the first beam.

15. The UE of claim 11, wherein the UE receives the signaling in a RRC_CONNECTED state.

16. The UE of claim 11, wherein the processor is further configured to:
after the transmission using the at least one PUR is not successful, determine whether the first beam becomes unsuitable based on the RSRP of the first SSB;
select a second SSB from the multiple SSBs to perform a retransmission of the data in the RRC_INACTIVE state if the UE determines that the first beam is unsuitable and the second SSB fulfills the at least one condition; and
perform the retransmission using the at least one PUR via a second beam associated with the second SSB.

17. The UE of claim 16, wherein the UE considers a TA associated with the first beam as invalid if the first beam becomes unsuitable.

18. The UE of claim 16, wherein the processor is further configured to initiate the RA procedure and perform the retransmission during the RA procedure if no SSB of the multiple SSBs fulfills the at least one condition.

19. The UE of claim 16, wherein the UE determines that the first beam becomes unsuitable if the RSRP of the first SSB is less than the first threshold.

20. The UE of claim 16, wherein the UE determines that the transmission using the at least one PUR is not successful if the UE does not receive a response of the transmission from the network node.

* * * * *